(12) United States Patent
Samah et al.

(10) Patent No.: US 11,487,911 B1
(45) Date of Patent: Nov. 1, 2022

(54) SYSTEMS AND METHODS FOR PROVIDING INCREMENTAL MID-SURFACE FOR COMPUTER SIMULATION

(71) Applicant: MSC.Software Corporation, Newport Beach, CA (US)

(72) Inventors: Michel Samah, San Diego, CA (US); James Harvey Leedom, Columbus, NJ (US); Yu Xia, Irvine, CA (US); Arul Arangan, Laguna Niguel, CA (US); Douglas Brennan, Newport Beach, CA (US)

(73) Assignee: HEXAGON MANUFACTURING INTELLIGENCE, INC., Irvine, CA (US)

( * ) Notice: Subject to any disclaimer, the term of this patent is extended or adjusted under 35 U.S.C. 154(b) by 658 days.

(21) Appl. No.: 14/874,800

(22) Filed: Oct. 5, 2015

(51) Int. Cl.
*G06F 30/00* (2020.01)
*G06F 30/15* (2020.01)
*G06F 113/24* (2020.01)
*G06T 15/40* (2011.01)
*G06T 17/20* (2006.01)
*G06T 15/08* (2011.01)
*G06F 30/23* (2020.01)

(52) U.S. Cl.
CPC ............. *G06F 30/00* (2020.01); *G06F 30/15* (2020.01); *G06F 30/23* (2020.01); *G06F 2113/24* (2020.01); *G06T 15/08* (2013.01); *G06T 15/40* (2013.01); *G06T 17/20* (2013.01); *G06T 2210/04* (2013.01); *G06T 2219/2021* (2013.01)

(58) Field of Classification Search
CPC .......................... G06F 17/5004; G06T 15/40
See application file for complete search history.

(56) References Cited

U.S. PATENT DOCUMENTS

| 6,058,259 | A | * | 5/2000 | Murakami | G06T 17/10 345/420 |
| 6,229,545 | B1 | * | 5/2001 | Satoh | G06T 17/00 345/419 |
| 6,704,693 | B1 | * | 3/2004 | Fan | G06F 17/5018 700/98 |

(Continued)

OTHER PUBLICATIONS

Dong-Pyoung Sheen et al , "Transformation of a thin-walled solid model into a surface model via solid deflation", (Computer-Aided Design 42 (2010) pp. 720-730).*

(Continued)

*Primary Examiner* — Akash Saxena
(74) *Attorney, Agent, or Firm* — Foley & Lardner LLP

(57) ABSTRACT

Embodiments described herein relate to apparatuses and methods for generating face pair surfaces of a solid, including, but not limited to, identifying at least two face pairs including a first face pair and a second face pair. Each of the first and second face pairs including at least two face pair surfaces, graphically displaying the at least two face pairs, and receiving user input for at least one of (1) merging the first face pair and the second face pair, (2) deleting the first face pair, (3) adding a third face pair, (4) adding an additional surface to one of the at least two face pair surfaces of the first face pair, (5) removing at least one face pair surface of the first face pair, or (6) splitting the second face pair into at least a fourth and a fifth face pair, and determining at least one adjusted face pair based on the user input.

20 Claims, 21 Drawing Sheets

(56) References Cited

U.S. PATENT DOCUMENTS

| | | | | |
|---|---|---|---|---|
| 7,376,540 B2* | 5/2008 | Onodera | ................ | G06F 17/50 700/118 |
| 8,260,583 B2* | 9/2012 | Mawby | ................... | G06F 30/00 703/1 |
| 8,457,931 B2* | 6/2013 | Isoshima | ............ | G06F 17/5018 703/1 |
| 8,874,248 B2* | 10/2014 | Young | ................ | B29C 67/0088 345/419 |
| 9,836,884 B2* | 12/2017 | Quilot | .................... | G06T 17/30 |
| 10,042,962 B2* | 8/2018 | Nakhjavani | ............ | G06F 30/23 |
| 10,311,169 B1* | 6/2019 | Leedom | ............ | G06F 30/00 |
| 2004/0186604 A1* | 9/2004 | Onodera | ................ | G06F 17/50 700/97 |
| 2004/0243360 A1* | 12/2004 | Niedermeier | .......... | G06F 30/00 703/1 |
| 2008/0002889 A1* | 1/2008 | Shimada | ................. | G06T 17/10 382/197 |
| 2008/0052048 A1* | 2/2008 | Onodera | ............ | G06F 17/5018 703/2 |
| 2009/0271156 A1* | 10/2009 | Kageura | ................. | G06T 17/20 703/1 |
| 2012/0050288 A1* | 3/2012 | Crucs | ..................... | G06T 15/08 345/422 |
| 2015/0339409 A1* | 11/2015 | Nakhjavani | ............ | G06T 19/00 703/1 |

OTHER PUBLICATIONS

C.S. Chong et al, "Automatic solid decomposition and reduction for non-manifold geometric model generation", (Computer-Aided Design 36 (2004) pp. 1357-1369).*

* cited by examiner

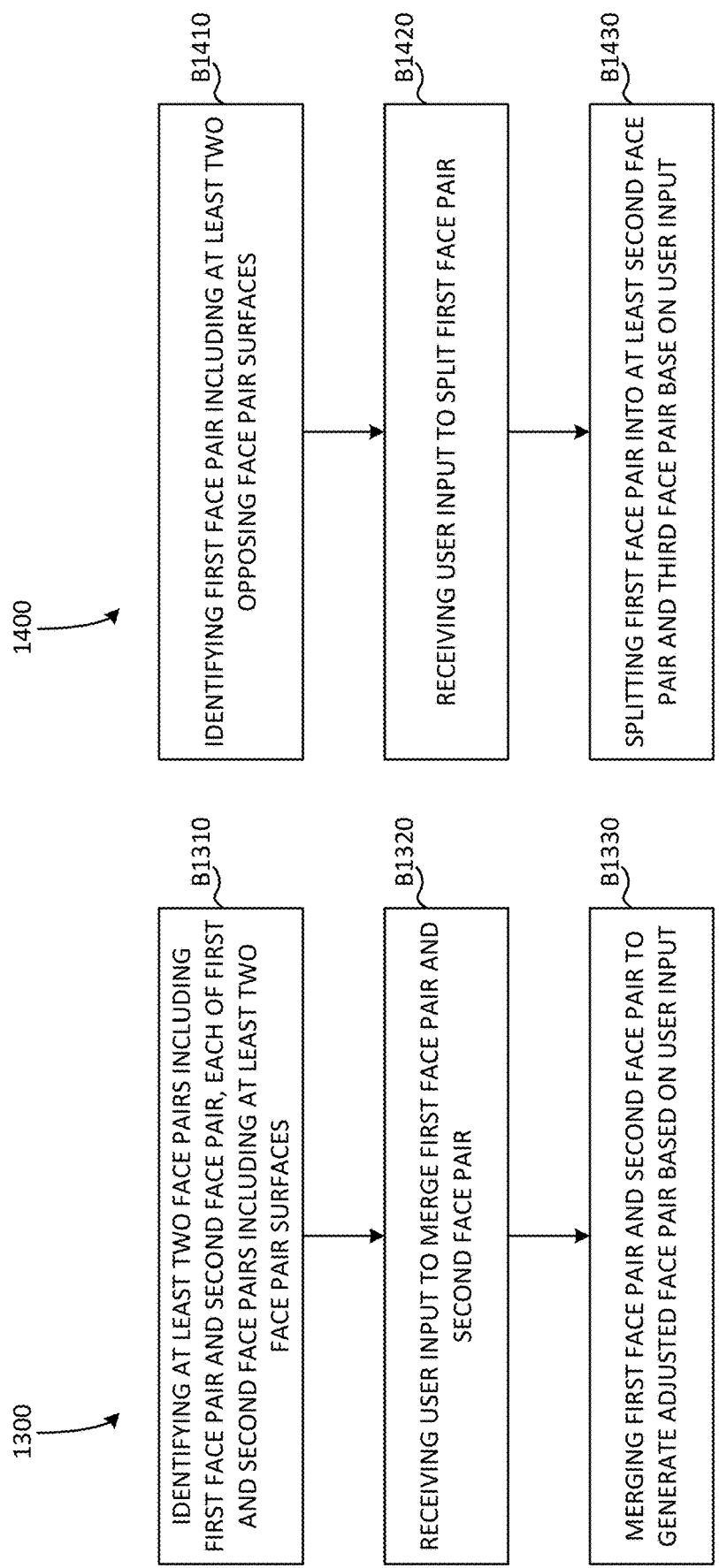

SYSTEMS AND METHODS FOR PROVIDING INCREMENTAL MID-SURFACE FOR COMPUTER SIMULATION

CROSS-REFERENCE TO RELATED PATENT APPLICATIONS

This application relates to application to Ser. No. 14/830,656, titled SYSTEMS AND METHODS FOR AUTOMATIC THICKNESS CALCULATION, and filed on Aug. 19, 2015, which is incorporated herein by reference, in its entirety. This application also relates to application Ser. No. 14/843,472, titled SYSTEMS AND METHODS FOR AUTOMATIC THICKNESS DETERMINATION, filed on Sep. 2, 2015, which is incorporated herein by reference, in its entirety. This application also relates to application Ser. No. 14/738,616, titled FINITE ELEMENT BASED DIRECT MODELING, filed on Jun. 12, 2015, which is incorporated herein by reference, in its entirety.

BACKGROUND

1. Field

The present disclosure relates generally to face pair and mid-surface determination of a virtual representation of an object.

2. Background

A face pair includes opposing exterior surfaces of a solid in a Computer-Aided Design (CAD) model. Inappropriate automatic identification of face pair can cause increased manual work (via user input) to correct the face pair, adding burden to a user of the simulation platform.

Conventional automatic mid-surface extraction tools directly extract the mid-surface from automatic identified face pair. This can be a straightforward option that likely generates an inappropriate mid-surface given that the identified face pair is inappropriate. Other conventional mid-surface extraction tools requiring user input are complex and unintuitive, often causing tremendous user-unfriendliness.

SUMMARY OF THE INVENTION

Embodiments described herein related to an incremental mid-surface workflow for generating a mid-surface from a face pair of a solid. At least one face pairs of the solid can first be identified automatically. Modification and adjustment of the identified face pairs can be performed based, as least in part, on user input. Particularly, the user can edit face pair surfaces of a given face pair and/or edit a face pair as a unit. The face pairs can be displayed in different graphical states. After automatic identification, editing, and previewing the face pairs, the face pairs can be defined. Even after the face pairs are defined, the user can still edit and preview the defined face pairs. The mid-surface can be extracted from the defined face pairs.

The face pair can be automatically identified based on dimensions, topological connections, and/or geometric continuity of the surfaces and/or volumes of at least a portion of the solid. The face pairs can be edited by editing one or more face pair surfaces of a given face pair. The face pairs can also be edited by editing face pairs as units. The face pairs can be displayed differently based, at least in part, on different grouping of the face pairs, a method by which each face pair is identified, and a method by which a mid-surface is identified and/or the like.

In some embodiments, a method for generating face pair surfaces of a solid includes, but not limited to, identifying at least two face pairs including a first face pair and a second face pair. Each of the first and second face pairs including at least two face pair surfaces, graphically displaying the at least two face pairs, and receiving user input for at least one of (1) merging the first face pair and the second face pair, (2) deleting the first face pair, (3) adding a third face pair, (4) adding an additional surface to one of the at least two face pair surfaces of the first face pair, (5) removing at least one face pair surface of the first face pair, or (6) splitting the second face pair into at least a fourth and a fifth face pair, and determining at least one adjusted face pair based on the user input.

According to some embodiments, a method for generating face pair surfaces of a solid includes identifying at least two face pairs comprising a first face pair and a second face pair, each of the first and second face pairs comprising at least two opposing face pair surface, receiving user input to merge the first face pair and the second face pair, and merging the first face pair and the second face pair to generate an adjusted face pair based on the user input.

In various embodiments, a method for splitting face pair surfaces of a solid includes identifying a first face pair comprising at least two opposing face pair surfaces, receiving user input to split the first face pair; and splitting the first face pair into at least a second face pair and a third face pair base on the user input.

According to some embodiments, a non-transitory computer-readable medium including computer-readable instructions, such that, when executed, causes a processor to perform a method for generating face pair surfaces of a solid, the method including identifying at least two face pairs comprising a first face pair and a second face pair, each of the first and second face pairs comprising at least two face pair surfaces, graphically displaying the at least two face pairs, receiving user input for at least one of (1) merging the first face pair and the second face pair, (2) deleting the first face pair, (3) adding a third face pair, (4) adding an additional surface to one of the at least two face pair surfaces of the first face pair, (5) removing at least one face pair surface of the first face pair, or (6) splitting the second face pair into at least a fourth and a fifth face pair, and determining at least one adjusted face pair based on the user input.

According to some embodiments, a non-transitory computer-readable medium including computer-readable instructions, such that, when executed, causes a processor to perform a method for generating face pair surfaces of a solid, the method including identifying at least two face pairs comprising a first face pair and a second face pair, each of the first and second face pairs comprising at least two opposing face pair surfaces, receiving user input to merge the first face pair and the second face pair, and merging the first face pair and the second face pair to generate an adjusted face pair based on the user input.

In some embodiments, a non-transitory computer-readable medium including computer-readable instructions, such that, when executed, causes a processor to perform a method for splitting face pair surfaces of a solid, the method including identifying a first face pair comprising at least two opposing face pair surfaces, receiving user input to split the first face pair, and splitting the first face pair into at least a second face pair and a third face pair base on the user input.

BRIEF DESCRIPTION OF THE DRAWINGS

The disclosure will become more fully understood from the following detailed description, taken in conjunction with the accompanying figures, wherein like reference numerals refer to like elements, in which:

FIG. 13 is a process flow diagram illustrating an example of face pair merging method for merging at least a first face pair and a second face pair according to various embodiments.

FIG. 14 is a process flow diagram illustrating an example of face pair splitting method for splitting a first face pair into at least a second face pair and a third face pair according to various embodiments.

DETAILED DESCRIPTION

Figure 1:
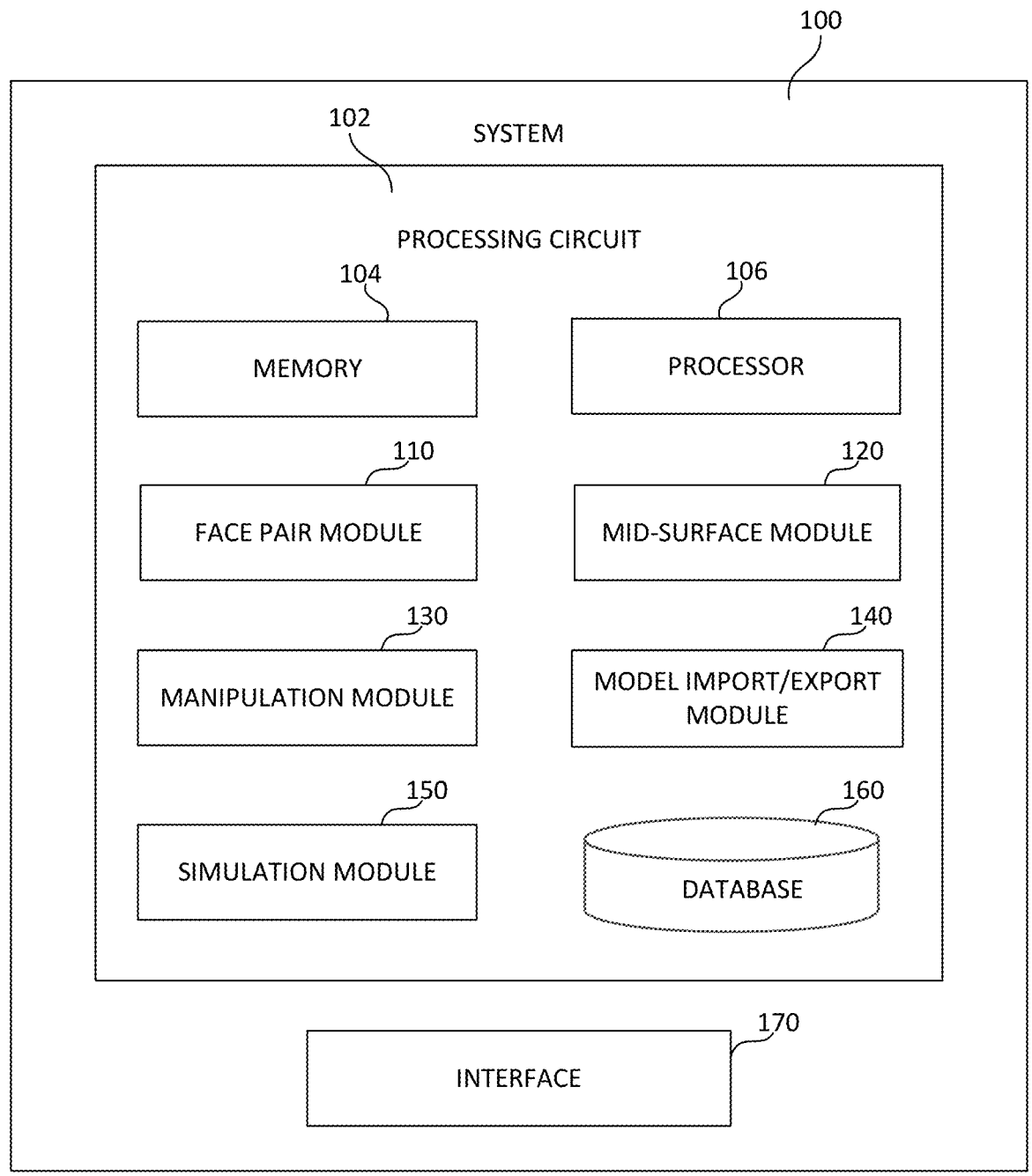
FIG. 1 is a block diagram illustrating an example of a mid-surface determination system according to various embodiments.

The detailed description set forth below in connection with the appended drawings is intended as a description of various aspects of the present disclosure and is not intended to represent the only aspects in which the present disclosure can be practiced. Each aspect described in this disclosure is provided merely as an example or illustration of the present disclosure, and should not necessarily be construed as preferred or advantageous over other aspects. The detailed description includes specific details for providing a thorough understanding of the present disclosure. However, it will be apparent to those skilled in the art that the present disclosure can be practiced without these specific details. In some instances, structures and devices are shown in block diagram form in order to avoid obscuring the concepts of the present disclosure. Acronyms and other descriptive terminology can be used merely for convenience and clarity and are not intended to limit the scope of the present disclosure.

While for purposes of simplicity of explanation, the methodologies are shown and described as a series of acts, it is to be understood and appreciated that the methodologies are not limited by the order of acts, as some acts can, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts can be required to implement a methodology in accordance with one or more aspects.

Referring generally to the FIGS., embodiments described herein relate to apparatuses and methods for incremental mid-surface face pair workflow. Particularly, embodiments relate to identifying, visualizing, adjusting, and determining at least one face pair of a model. The face pair can be used for various operations performed on the solid, including, but not limited to, thickness calculation, mid-surface determination, and the like. Generally, a well-defined face pair can allow appropriate automatic mid-surface determination, as the mid-surface can be extracted from the face pair (a non-limiting example of which is described in application Ser. No. 14/830,656 (titled SYSTEMS AND METHODS FOR AUTOMATIC THICKNESS CALCULATION, and filed on Aug. 19, 2015) and/or application Ser. No. 14/843,472 (titled SYSTEMS AND METHODS FOR AUTOMATIC THICKNESS DETERMINATION, filed on Sep. 2, 2015)). Given that thickness determination can be based on the mid-surface and/or the face pair, the well-defined face pair can also contribute to appropriate thickness determination.

In some embodiments, one or more face pairs can be automatically identified for a solid in a suitable manner. Illustrating with a non-limiting example, the face pair can be identified based on a dimension of a surface, area of the surface, a distance between two opposing surfaces, or the like. In further embodiments, a ratio computed using one or more of the dimensions of the surface, area of the surface, or distance between the two opposing surfaces can be implemented in face pair identification. In particular embodiments, opposing surfaces can be grouped into a same face pair using a thickness ratio. The thickness ratio (t) can be computed using an equation such as, but not limited to:

$$t = A/D^2 \qquad (1);$$

where A is the area of the surface, and D is the distance between the surface and an opposing surface. The user can set a threshold for t. When the threshold is higher, face pairs for thinner subcomponents of the solid can be identified and/or grouped together. On the other hand, when the threshold is lower, face pairs for thicker subcomponents (as well as any thinner subcomponents) of the solid can be identified and/or grouped together as a face pair.

After the automatic identification, the face pair surfaces can be visualized. The face pair can be adjusted based at least partially on user input or automatically. The visualization and adjustment can be executing simultaneously (or, in alternative embodiments, in a sequential manner) to allow the user a clear view of the face pair surfaces being adjusted. When the face pair are determined, processes (including, but not limited to, mid-surface determination, thickness determination, and the like) can be performed based on the determined face pair. The processes can also include manipulation of at least one of the solid, the mid-surface, the face pair, or other portions of the solid. After the processes are performed, the face pair can again be visualized and/or adjusted, forming an iterative and incremental cycle.

Visualizing the face pair can refer to presenting the face pair graphically using interactive color-codes to distinguish face pair surfaces from one another, allowing easier and intuitive modification by the user. In particular embodiments, different graphical states can be used to indicate different face pairs, different approaches by which the face pairs are identified, different approaches by which the mid-surface associated with the face pairs are extracted, and the like. When a user interactive element (e.g., a mouse cursor) interacts with (e.g., mouses over) a portion of a face pair surface, the entire associated face pair can be displayed in an emphatic graphical state (e.g., highlighting).

In further embodiments, the face pairs (and associated mid-surfaces) can be presented in different graphical states based on methods or algorithms by which the face pair is identified. Specifically, a face pair identified using a first algorithm can be displayed in a different graphical state than the graphical state of another face pair identified using a second algorithm. The methods can include identification based on, for example, but not limited to, user input, dimensions of the surface, area of the surface, (average) distance between the two opposing surface, thickness ratio, and the like. The user can interact with the graphically displayed face pair (and at least one associated mid-surface) to modify the method by which the face pair is identified. Upon receiving a first user input selecting a particular face pair or mid-surface as displayed, the method by which the face pair is identified can be altered based on a second user input indicating the preferred alternative method.

In further embodiments, the face pairs (and associated mid-surfaces) can be presented in different graphical states based on methods or algorithms by which the mid-surface is extracted. Specifically, a first face pair having a mid-surface (and/or the mid-surface itself) determined using a first algorithm can be displayed in a different graphical state than the graphical state of a second face pair having a mid-surface (and/or the mid-surface itself) determined using a second algorithms. The methods to determine the mid-surface can include determination based on, for example, but not limited to, user input, distance between the face pair, dimension of the face pair, dimension of the solid, and the like. The user can interact with the graphically displayed mid-surface (and associated face pair) to modify the method by which the mid-surface is determined. Upon receiving a first user input selecting a particular mid-surface or face pair as displayed, the method by which the mid-surface is determined can be altered based on a second user input indicating the preferred alternative method.

Adjusting the face pair can also include adding, merging, deleting, splitting one or more face pair surfaces or face pairs. For example, the user can select one of the face pairs identified for the solid and add or remove at least a portion of surfaces associated with the face pairs. In some embodiments, two or more distinct face pairs can be selected by the user and merged together into a same face pair. The same face pair can be treated as a single unit and displayed in a same graphical state. On the other hand, a single face pair can be split into two or more different face pairs, based on user input. At least one face pair can be selected by the user then deleted.

In some embodiments, at least one face pair can be selected by the user for extracting a mid-surface associated with and based on the face pair. The mid-surface and its associated face pair can be previewed (i.e., showing only the selected face pair and the associated mid-surface) while refraining from displaying other parts of the solid.

Determining the face pair can include any automatic or user input indicating that the face pair surfaces have been sufficiently decided for the processes (at least with respect to a current workflow cycle).

FIG. 1 is a block diagram illustrating an example of a mid-surface determination system 100 according to various embodiments. Referring to FIG. 1, the mid-surface determination system 100 can include at least a face pair module 110, a mid-surface module 120, a manipulation module 130, a model import/export module 140, and a simulation module 150 to implement features described herein. In particular, each of the face pair module 110, mid-surface module 120, manipulation module 130, model import/export module 140, and simulation module 150 can be a module configured to virtually perform face pair and mid-surface determination functionalities described herein. The mid-surface determination system 100 can be executed on Computer Aided Engineering (CAE), Finite Element Analysis (FEA), and other suitable simulation platforms.

The mid-surface determination system 100 can include a processing circuit 102 and an interface 170. The processing circuit 102 can be part of a workstation computer or other suitable types of computing device. The processing circuit 102 can include the various modules 110, 120, 130, 140, and 150 for executing various functions described herein. The processing circuit 102 can also include a memory 104, processor 106, and database 160. The mid-surface determination system 100 can include other devices such as a network system, wireless or wired communications systems, printers, and/or the like for performing various functions described herein.

The processor 106 can include any suitable data processing device, such as a general-purpose processor (e.g., a microprocessor). But in the alternative, the processor 106 can be any conventional processor, controller, microcontroller, or state machine. The processor 106 can also be implemented as a combination of computing devices, e.g., a combination of a Digital Signal Processor (DSP) and a microprocessor, a plurality of microprocessors, at least one microprocessors in conjunction with a DSP core, or any other such configuration. For example, the processor 106 can be, but is not limited to being, an Intel® designed processor, AMD® designed processor, Apple® designed processor, QUALCOMM® designed processor, or ARM® designed process. The processor 106 can be used to implement features of the various modules 110, 120, 130, 140, and 150.

The memory 104 (or storage device) can be operatively coupled to the processor 106 and can include any suitable device for storing software instructions and data for controlling and use by the processor 106 to perform operations and functions described herein, including, but not limited to, Random Access Memory (RAM), Read Only Memory (ROM), floppy disks, hard disks, dongles or other Recomp Sensor Board (RSB) connected memory devices, or the like. The memory 104 can include non-transitory storage media that is configured to store information regarding a geometric model that is being currently modified or was created in the past and/or computer readable instructions for the processes performed by the processor 106 as described.

The memory 104 can send data to or receive data from the processor 106 and/or each of the modules/components 110-160 in the mid-surface determination system 100. In some embodiments, the memory 104 can be a remote storage device that stores data for the mid-surface determination system 100 (or only the processing circuit 102) in a different node of a network from the processing circuit 102 and/or the mid-surface determination system 100. In other embodiments, the memory 104 can be located on the same computer system (e.g., within the same node of the network) as the processing circuit 102 and/or the mid-surface determination system 100. In other embodiments, one or more of the various modules 110, 120, 130, 140, and 150 can be implemented with a dedicated memory unit (separate from the memory 104) such as, but not limited to, the memory 104.

The processor 106 can be coupled to one or more of all of the modules 110, 120, 130, 140, and 150 in the mid-surface determination system 100 for performing the functionalities of each of the coupled modules 110, 120, 130, 140, and 150. For example, the processor 106 can implement the face pair module 110 for identifying at least one face pair of a solid and editing at least one face pair or face pair surface. The processor 106 can perform such actions of the face pair module 110 automatically or based on user input. The user input can be received via an input device of the interface 170. The processor 106 can also graphically display the identified or determined face pair by coupling to a display device of the interface 170.

The processor 106 can implement the mid-surface module 120 for identifying and editing at least one mid-surface of the solid automatically or based on user input. The user input can be received via the input device of the interface 170. The processor 106 can also graphically display the identified or determined mid-surface by coupling to the display device of the interface 170.

The processor 106 can implement the manipulation module 130 for manipulating surface of the solid, 3-dimensional shape of the solid, face pairs, mid-surfaces, and the like based on user input. The user input can be received via the input device of the interface 170. The processor 106 can implement the model import/export module 140 to import the model (including the solid and/or sheet data). In some embodiments, the model import/export module 140 can be coupled to the user interface 170 for receiving user input (user-generated data) related to solid to be imported by the model import/export module 140. In other embodiments, the model import/export module 140 can be configured to import model data from another memory device or another system. The model import/export module 140 can send model information (including the solid and/or sheet data) corresponding to the imported model to one or more or all of the modules 110, 120, 130, 140, and 150 in the mid-surface determination system 100. The model import/export module 140 can export the model. The processor 106 can implement the simulation module 150 to perform simulations of the model including the solid associated with the face pairs and the mid-surfaces as determined.

In some embodiments, the database 160 can be any non-transitory storage medium (e.g., the memory 104) configured to store data. For example, the database 160 can store the model data (including data of the solid, the face pairs, and the mid-surfaces).

The interface 170 can include at least one input device for receiving input from the user and at least one display device for relaying information to the user. For example, the input device can include a computer with a monitor, keyboard, keypad, mouse, joystick, touch screen display, or other input devices performing a similar function. The keyboard can include alphanumeric and other keys, and can be connected to processing circuit 102 (e.g., the processor 106 and the memory 104) for communicating information and command selections. The input device can include a touch screen interface or movement sensing interface that can be combined with, or separated from, the display device of the interface 170. The input device can include a cursor control device, such as, but not limited to, a mouse, trackball, touch screen, motion sensor, cursor direction keys, and the like. Such input device can control cursor movement on the display device. The display device of the interface 170 can be any type of display (e.g., CRT display, LCD display, etc.) configured to provide audio and/or visual output to the user.

Figure 2:
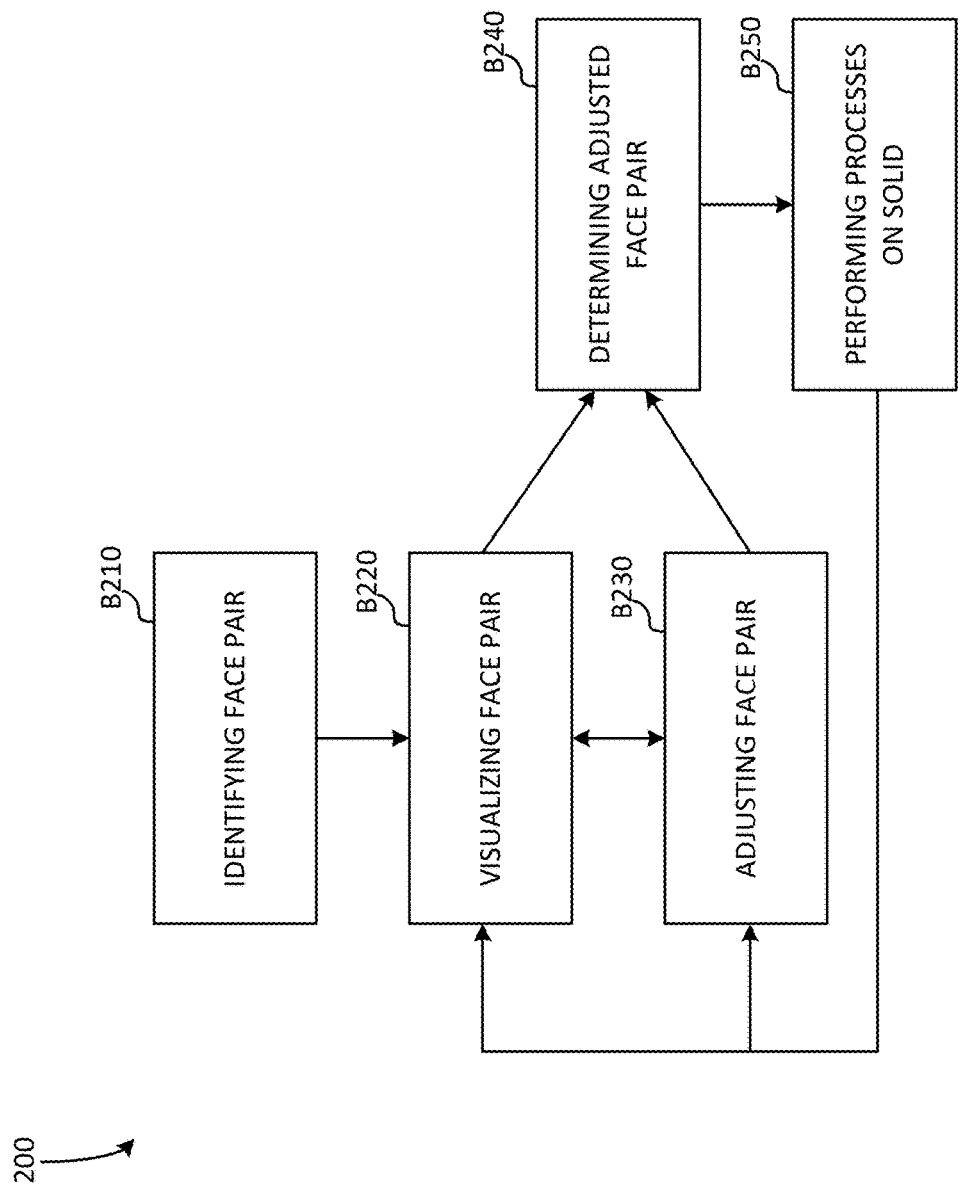
FIG. 2 is a process flow diagram illustrating an example of an incremental mid-surface determination method for incrementally determining a mid-surface of a solid according to various embodiments.

FIG. 2 is a process flow diagram illustrating an example of an incremental mid-surface determination method 200 for incrementally determining a mid-surface of a solid according to various embodiments. Referring to FIGS. 1-2, the face pair module 110 can initially identify at least one face pair for the solid. For example, the at least one face pair can be identified based on the dimension of one or more surfaces of the solid, the area of one or more surfaces of the solid, the distance between two opposing surfaces, and/or the like. In some embodiments, the face pair can be identified in a manner such as, but not limited to, described with respect to application Ser. No. 14/830,656 (titled SYSTEMS AND METHODS FOR AUTOMATIC THICKNESS CALCULATION, and filed on Aug. 19, 2015) and/or application Ser. No. 14/843,472 (titled SYSTEMS AND METHODS FOR AUTOMATIC THICKNESS DETERMINATION, filed on Sep. 2, 2015)).

In further embodiments, the face pairs can be identified based on the ratio computed using one or more of the dimensions of the surface, area of the surface, and/or distance between the two opposing surfaces. Illustrating with a non-limiting example, opposing surfaces can be grouped into a same face pair using the thickness ratio, as set forth in, for example, but not limited to, equation (1). In still further embodiments, the user can, via the input device of the interface 170, designate the face pairs by selecting two or more distinct surfaces of the solid or inputting boundaries for surfaces that would constitute the face pair surfaces of a same face pair.

In some embodiments, block B210 can yield two or more different face pairs for the solid. Each face pair can include at least two opposing face pair surfaces. The face pairs can be identified in different manners (i.e., one or more of the methods described). For example, the user can designate and modify how face pairs for a same portion of the solid is to be identified. The user can subsequently change the method of identification (for example, with respect to block B230). In that case, the graphical state of the face pair having its identification method changed will also change.

At block B220, the one or more face pairs identified at block B210 can be visualized by the face pair module 110 (as coupled to the display device of the interface 170). Particularly, the one or more face pairs can be displayed in different graphical states (e.g., colors, shading, outlines, borders, highlights, and the like) when the face pairs are different face pairs (instead of a same face pair). In other words, a first face pair and a second face pair identified to be separate face pairs can be displayed in different graphical states so that the user can be aware that the first and second face pairs are separate face pairs. Additionally, the face pairs can be displayed in different graphical states to reflect a method by which the face pairs have been determined. That is to say, a first face pair identified using a first method can be displayed in a different graphical state as compared to a second face pair identified using a second method.

In further embodiments, the face pairs can be displayed in different graphical states to reflect a method by which the associated mid-surfaces are extracted. In other words, a first face pair associated with a first mid-surface identified using a first method can be displayed in a different graphical state as compared to a graphical state of a second face pair associated with a second mid-surface identified using a second method. The first and second mid-surfaces themselves can also be displayed in different graphical states based on the extraction methods used. The mid-surface can be extracted based on methods described herein, including, but not limited to, described in application Ser. No. 14/830,656 (titled SYSTEMS AND METHODS FOR AUTOMATIC THICKNESS CALCULATION, and filed on Aug. 19, 2015) and/or application Ser. No. 14/843,472 (titled SYSTEMS AND METHODS FOR AUTOMATIC THICKNESS DETERMINATION, filed on Sep. 2, 2015)).

Additionally, visualizing the face pair can also include displaying a face pair in an emphatic graphical state (including, but not limited to, different colors, shading, outlines, borders, highlights, and the like) as compared to other face pairs when the face pair is selected by or at least interacted with the user via the input device of the interface 170. The face pair can be selected by interacting (e.g., with a mouse cursor or a touch location of a touch screen) with any location of a face pair surface of the face pair. Illustrating with a non-limiting example, when the user "mouses over" a location of one of the face pair surface of the face pair, the entire face pair can be displayed in the emphatic graphical state.

At block B230, the face pair module 110 can allow the user to adjust the face pair. Adjusting the face pair can refer to (1) merging two face pairs, (2) deleting a face pair from the solid, (3) adding an additional face pair, (4) adding an additional surface to one of the face pair surfaces, (5) removing at least one face pair surface (or a portion thereof) of a face pair, and/or (6) splitting a face pair into two different face pairs. In further embodiments, adjusting the face pair can also include changing a method by which a face pair is identified, changing a method by which the mid-surface is extracted, and the like. Such adjustments can be received via the input device of the interface 170 and processed via the face pair module 110.

Adjusted face pairs can be immediately visualized, at block B220. That is, visualization of the face pairs can immediately correspond to the adjustments. Illustrating with a non-limiting example, when the two face pairs are merged into a single face pair, the resulting (adjusted) face pair can be displayed in a same graphical state. Illustrating with another non-limiting example, the deleted face pair (unless added back) can be displayed in a graphical state (e.g., greyed out, shaded, hidden, or the like) different from undeleted face pair to inform the user of the deleted status of the deleted face pair. Illustrating with another non-limiting example, the added face pair (unless removed) can be displayed in a similar manner as described with respect to a face pair of the solid. Illustrating with another non-limiting example, the added surface can be a part of the face pair and can be displayed in a similar manner as described with the rest of the face pair. Illustrating with another non-limiting example, the removed at least one face pair surface (or the potion thereof) can no longer be a part of the face pair and can be displayed in a graphical state (e.g., greyed out, shaded, hidden, or as a part of another face pair) to indicate such. Illustrating with yet another non-limiting example, the face pairs split from a single face pair can be two separate face pairs and displayed as so.

While visualizing the face pair (at block B220) and/or adjusting the face pair (at block B230), the face pair module 110 can determine at least one adjusted face pair, at block B240. For example, the user can indicate, via the input device of the interface 170, that the face pairs of the solid are satisfactory, at least for the time being. The at least one adjust face pair can refer to resulting face pair(s) after the adjusting at block B230.

At block B250, processes can be performed on the solid. Such processes can include manipulating, with the manipulation module 130, shape and other properties (e.g., material, flexibility, or the like) of the solid. Illustrating with a non-limiting example, the solid can be manipulated via direct modeling as described in application Ser. No. 14/738,616, titled FINITE ELEMENT BASED DIRECT MODELING, filed on Jun. 12, 2015, which is incorporated herein by reference, in its entirety. Such processes can also include simulating the model and/or extracting a mid-surface with any methods described herein. After performing one or more processes at block B250, the face pair module 110 can continue to visualize the face pair (at block B220) and/or to adjust the face pair (at block B230).

Figure 3:
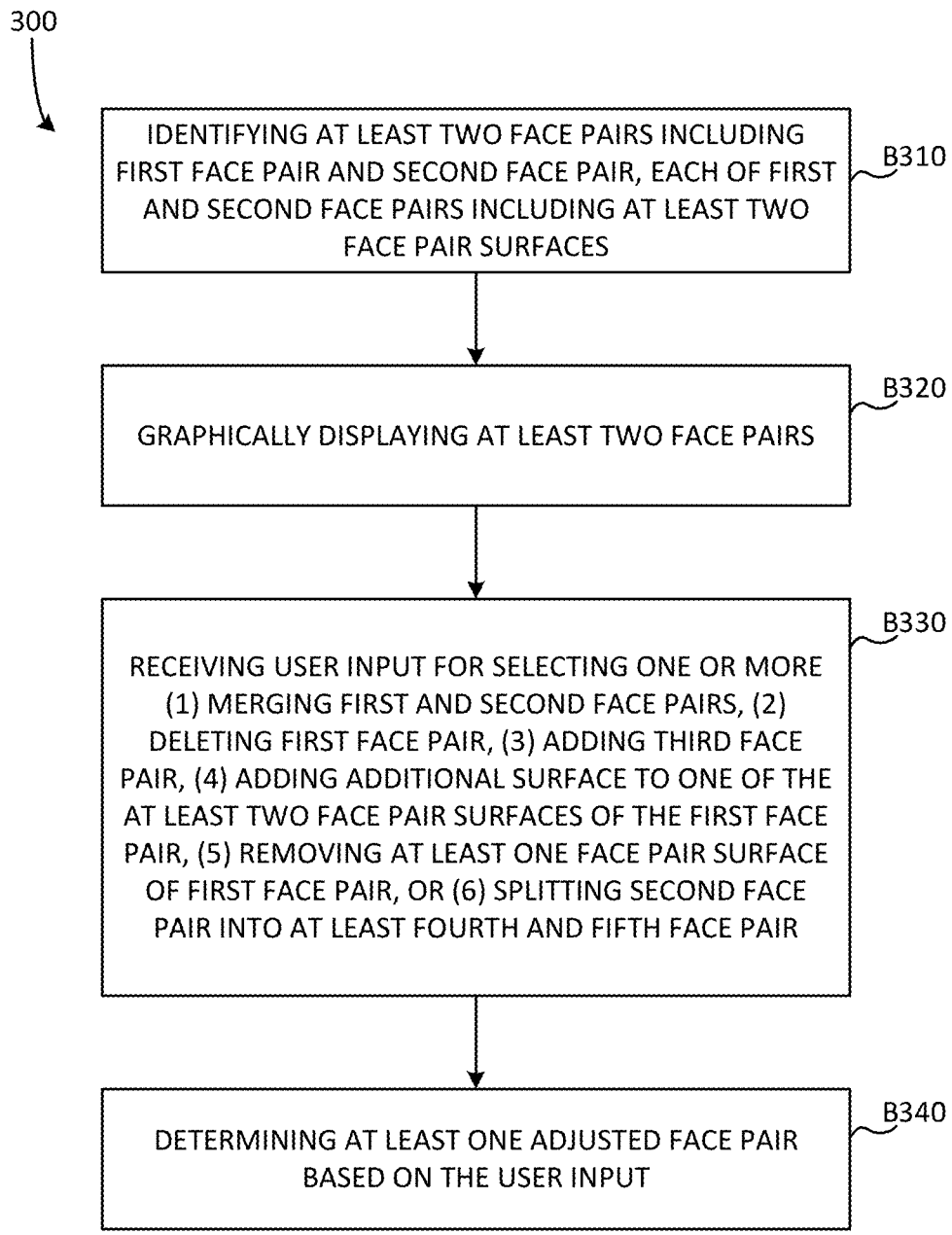
FIG. 3 is a process flow diagram illustrating an example of face pair definition method for defining at least one face pair of a solid according to various embodiments.

FIG. 3 is a process flow diagram illustrating an example of face pair definition method for defining at least one face pair of a solid according to various embodiments. Referring to FIGS. 1-3, at block B310, the face pair module can identify at least two face pairs including a first face pair and a second face pair in the manner described (such as, but not limited to, block B210). Each of the first and second face pairs can include at least two face pair surfaces.

At block B320, the face pair module 110 (as coupled to the display device of the interface 170) can graphically display or visualize the at least two face pairs (in a manner such as, but not limited to, described with respect to block B220).

At block B330, the input device of the interface 170 (as coupled to the face pair module 110) can receive user inputs for selecting one or more of (1) merging the first face pair and the second face pair, (2) deleting the first face pair, (3) adding a third face pair, (4) adding an additional surface to one of the at least two face pair surfaces of the first face pair, (5) removing at least one face pair surface of the first face pair, or (6) splitting the second face pair into at least a fourth and a fifth face pair.

At block B340, the face pair module 110 can determine at least one adjusted face pair based on the user input (in a manner such as, but not limited to, described with respect to block B240).

Figure 4A:
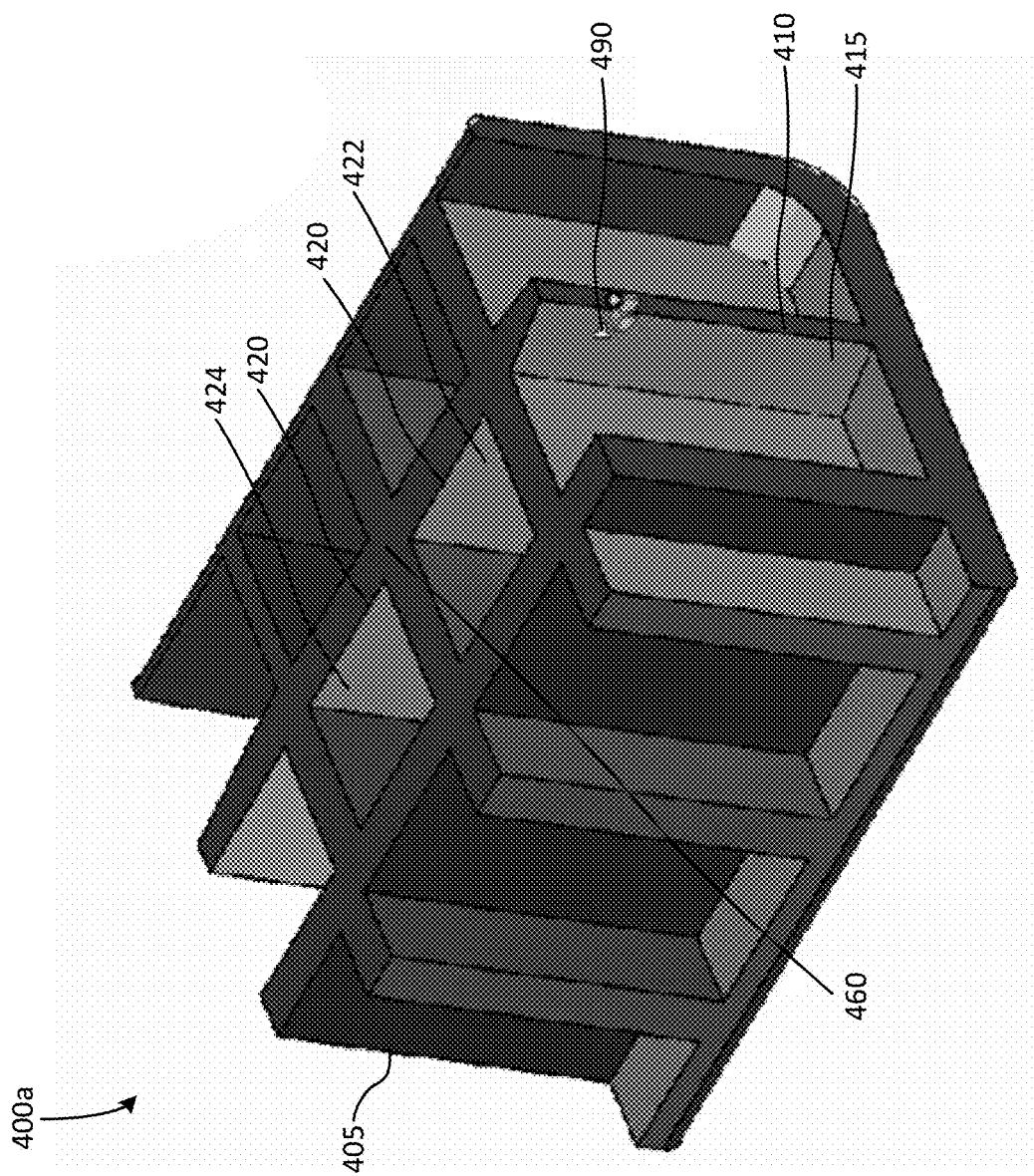
FIG. 4A is a diagram illustrating an example of a display screen implemented for merging a first face pair and a second face pair according to various embodiments.

FIG. 4A is a diagram illustrating an example of a display screen 400a implemented for merging a first face pair 410 and a second face pair 420 according to various embodiments. Particularly, the display screen 400a illustrates selecting the first face pair 410 to be merged. Referring to FIGS. 1-4A, a solid 405 can include at least two face pairs: the first face pair 410 and the second face pair 420. The face pairs 410 and 420 can be identified in a manner such as, but not limited to, described with respect to blocks B210 and B310. The face pairs 410 and 420 can also be products of adjustment (in a manner such as, but not limited to, described with respect to blocks B210 and B310) or other processes such as manipulation (in a manner such as, but not limited to, described with respect to block B250).

The first face pair 410 can include at least a first face pair surface 415 and another face pair surface (not shown in perspective for clarity) opposite to the first face pair surface 415. The second face pair 420 can include at least a second face pair surface 422 and a third face pair surface 424. The second face pair 420 can also include a corresponding face pair surface (not shown in perspective for clarity) opposite to the second face pair surface 422 and another corresponding face pair surface (not shown in perspective for clarity) opposite to the third face pair surface 424. The second and third face pair surfaces 422 and 424 (or portions of a surface on a same side of the solid 405) are not continuous and are separated or spaced apart by a portion 460. However, the second and third face pair surfaces 422 and 424 are aligned or substantially aligned (in the same plane). The corresponding face pair surfaces of the second face pair 420 can be similarly aligned.

A mouse cursor 490 (as provided by the input device of the interface 170) can be used to select the entire first face pair 410. Such selection can be made by selecting any portion of the first face pair surface 415 or any portion of the corresponding opposite face pair surface.

Figure 4B:
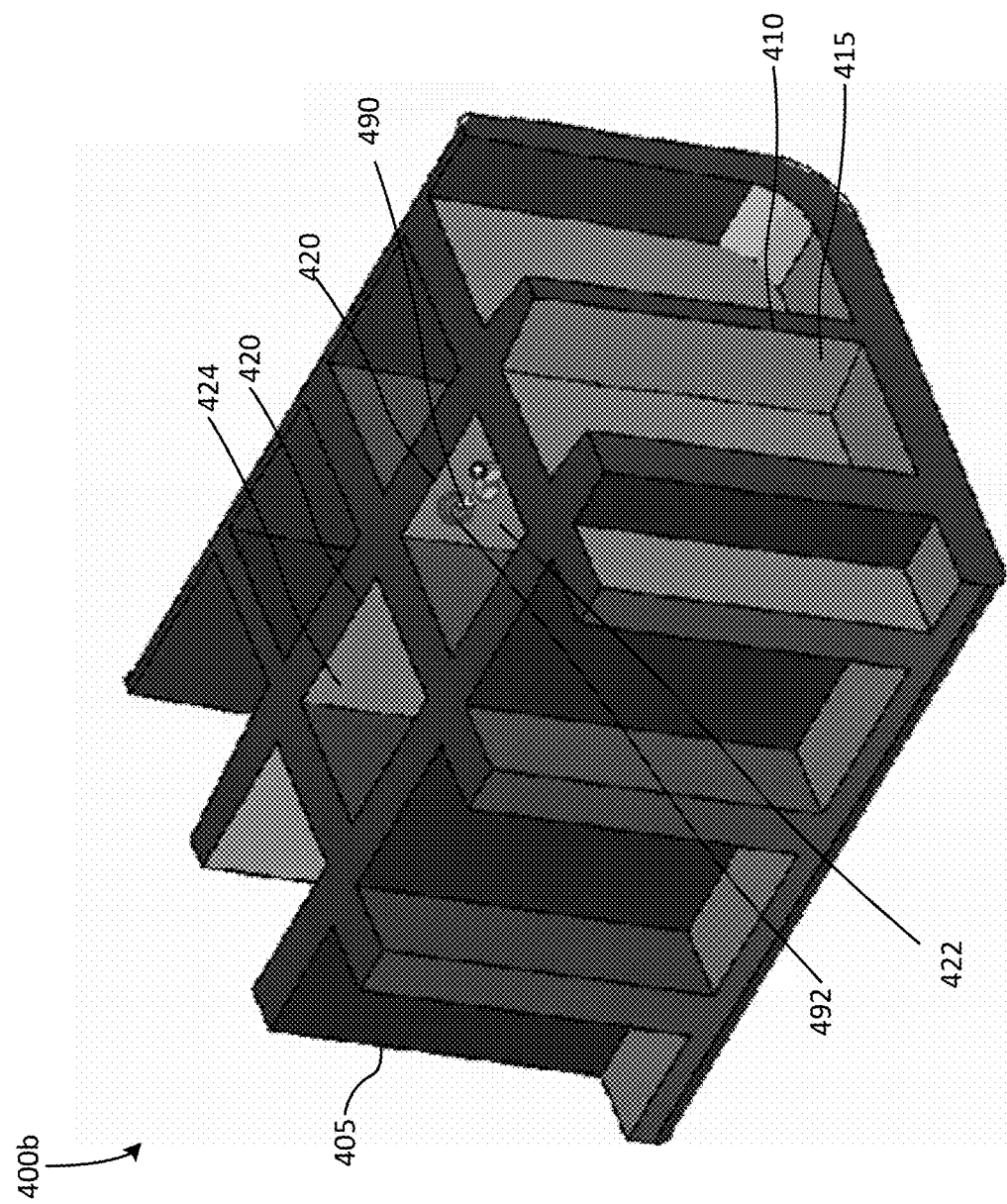
FIG. 4B is a diagram illustrating an example of a display screen implemented for merging a first face pair and a second face pair according to various embodiments.

FIG. 4B is a diagram illustrating an example of a display screen 400b implemented for merging the first face pair 410 and the second face pair 420 according to various embodiments. Particularly, the display screen 400b illustrates selecting the second face pair 420 to be merged. Referring to FIGS. 1-4B, the solid 405 can include at least the first face pair 410, first face pair surface 415, second face pair 420, second face pair surface 422, and third face pair surface 424 as described.

The mouse cursor 490 can be used to select the second face pair 420. Such selection can be made by selecting any portion of the second face pair surface 422, the third face pair surface 424, or the corresponding opposite face pair surfaces (not shown). Illustrating with a non-limiting example, when the mouse cursor 490 interacts with a location 492 of the second face pair surface 422, the entire second face pair 420 (including the second face pair surface 422, the third face pair surface 424, and the corresponding opposite face pair surfaces) can be selected.

Figure 4C:
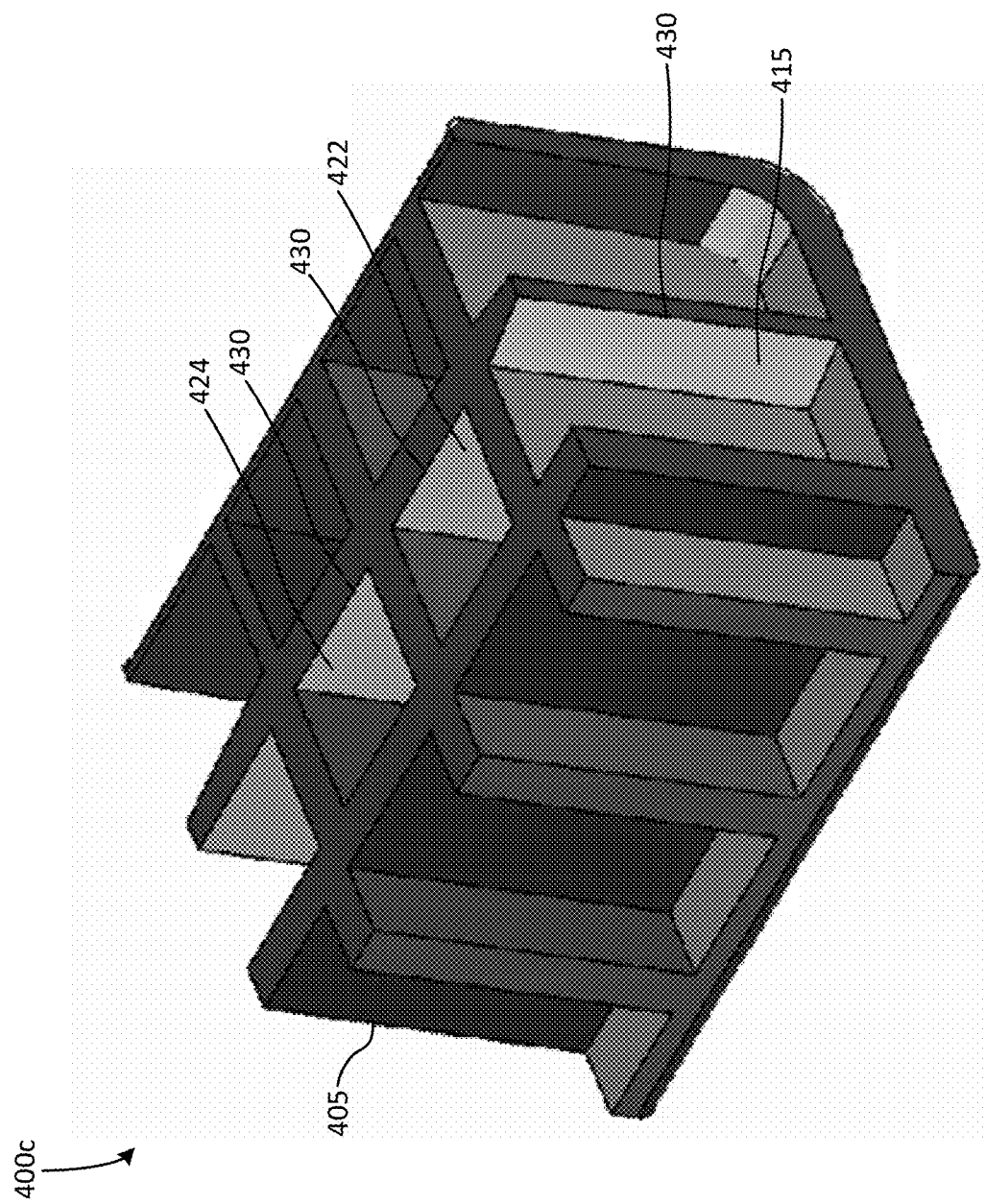
FIG. 4C is a diagram illustrating an example of a display screen implemented for merging a first face pair and a second face pair according to various embodiments.

FIG. 4C is a diagram illustrating an example of a display screen 400c implemented for merging the first face pair 410 and the second face pair 420 according to various embodiments. Particularly, the display screen 400b illustrates an adjusted (resulting) face pair 430 merged from the first face pair 410 and the second face pair 420. Referring to FIGS. 1-4C, the solid 405 can include at least the first face pair surface 415, second face pair surface 422, and third face pair surface 424 as described. After receiving a merge command via the input device of the interface 170, the face pair module 110 can combine the face pair surfaces of the first face pair 410 and the second face pair 420 to form the adjusted face pair 430. The adjusted face pair 430 can include the first face pair surface 415, second face pair surface 422, third face pair surface 424, as well as the corresponding surfaces on the other side of the solid 405. The adjusted face pair 430 can be treated as a single face pair that is displayed in a single graphical state based on various criteria described herein.

Figure 5A:
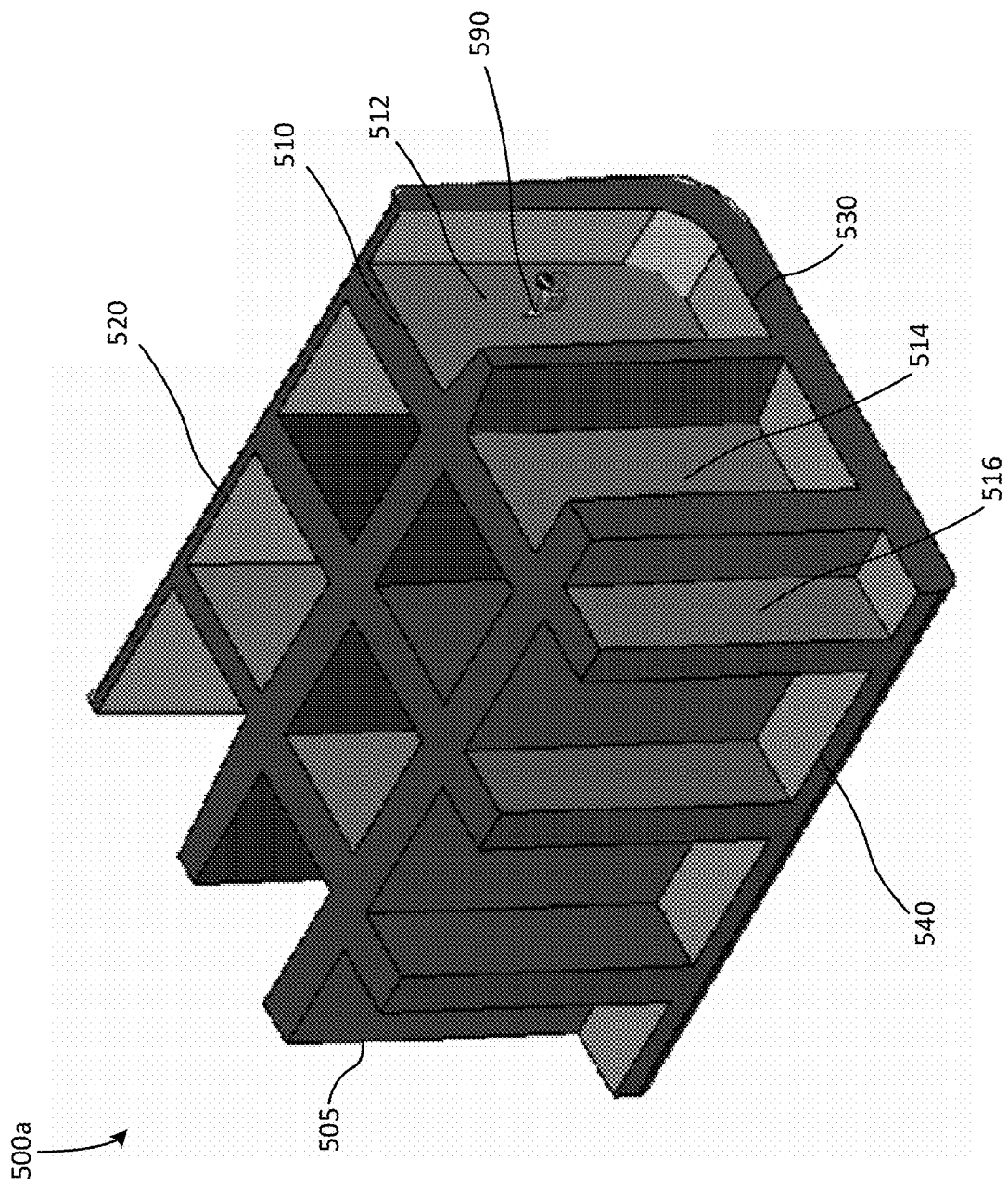
FIG. 5A is a diagram illustrating an example of a display screen implemented for deleting a face pair according to various embodiments.

FIG. 5A is a diagram illustrating an example of a display screen 500a implemented for deleting a face pair 510 according to various embodiments. Particularly, the display screen 500a illustrates selecting the face pair 510 to be deleted. Referring to FIGS. 1-5A, a solid 505 can include multiple face pairs such as, but not limited to, the face pair 510 and other face pairs 520-540. Each of the face pairs 510-540 can have opposing face pair surfaces. For example, the face pair 510 can include face pair surfaces 512, 514, and 516 (as well as opposing face pair surfaces not shown in perspective). The face pair 510 can be selected with a mouse cursor 590 at any portion of the face pair surfaces 512, 514, or 516 (or any of the opposing face pair surfaces).

Figure 5B:
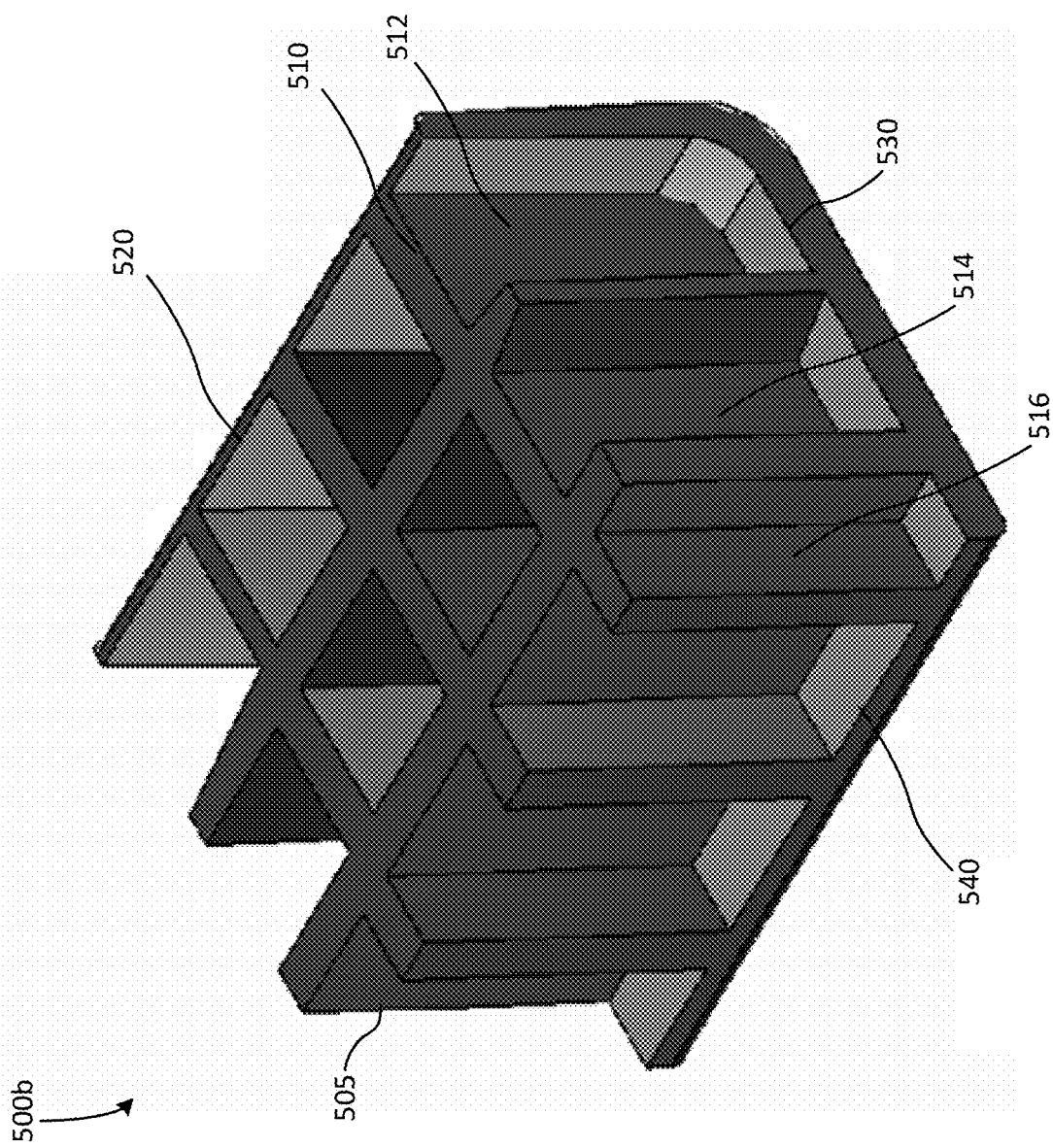
FIG. 5B is a diagram illustrating an example of a display screen implemented for deleting a face pair according to various embodiments.

FIG. 5B is a diagram illustrating an example of a display screen 500b implemented for deleting the face pair 510 according to various embodiments. Particularly, the display screen 500a illustrates the solid 505 with the face pair 510 deleted. Referring to FIGS. 1-5B, the solid 505 can include at least the face pairs 510-540 as described. When a "delete" command is received (before or after selecting the face pair 510) via the input device of the interface 170, the face pair 510 can be deleted (as a face pair of the solid 505). In other words, the face pairs associated with the solid 505 can no longer include the face pair 510 unless added. The solid 505 can still include the other face pairs 520-540. The deleted face pair 510 can be displayed in a different graphical state (e.g., greyed out, shaded, hidden, or the like) than the graphical state of the other face pairs 520-540 and/or the graphical state of the face pair 510 prior to the deletion.

Figure 6:
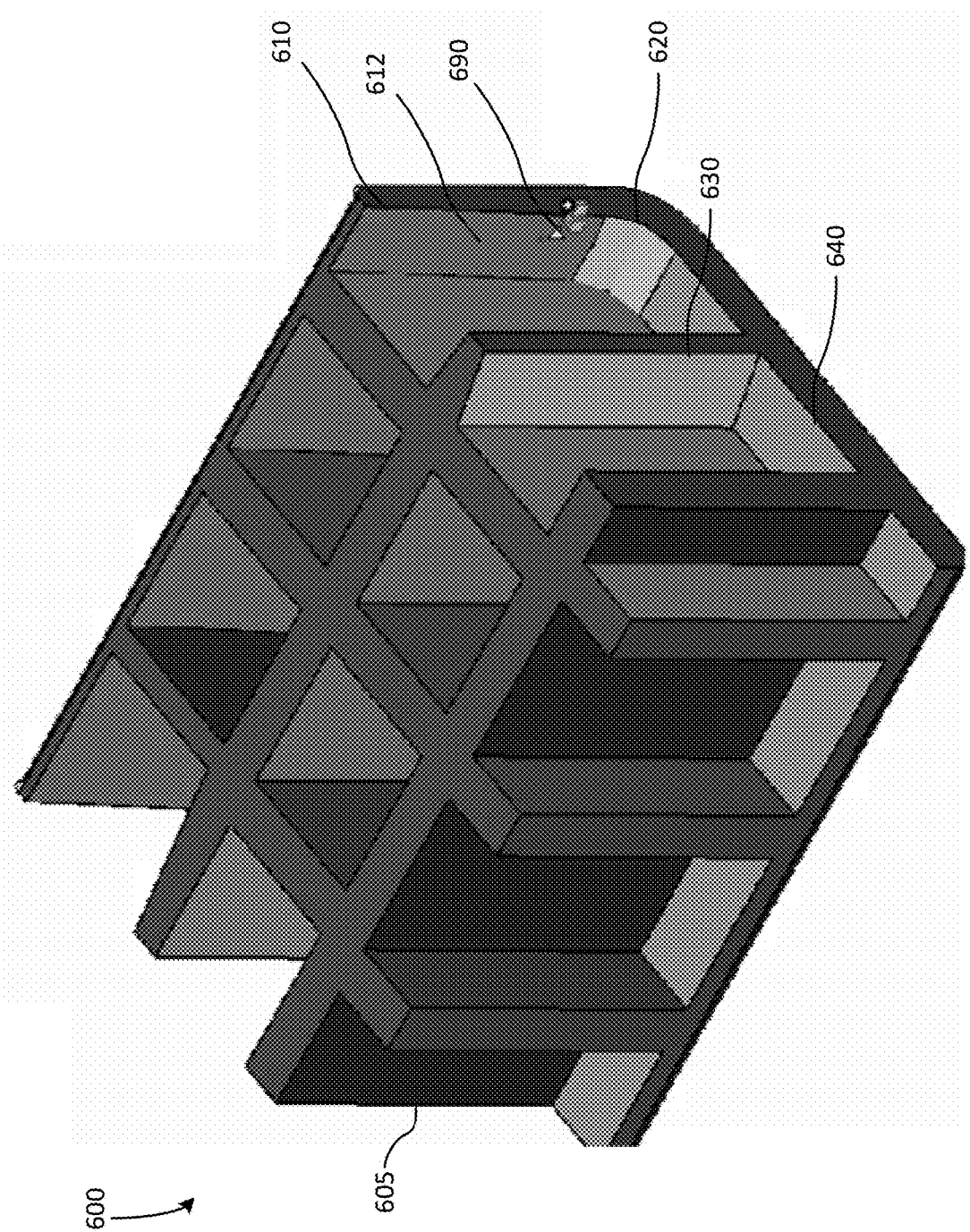
FIG. 6 is a diagram illustrating an example of a display screen implemented for adding a face pair according to various embodiments.

FIG. 6 is a diagram illustrating an example of a display screen 600 implemented for adding a face pair 610 according to various embodiments. Referring to FIGS. 1-6, a solid 605 can include at least the face pair 610 and other face pairs 620-640. The face pair 610 can include at least a face pair surface 612 and an opposing face pair surface (not shown in perspective). A mouse cursor 690 can be provided to receive user input for selecting the face pair 610 (by selecting any part of the face pair surface 612 or the opposing face pair surface).

Alternatively, the mouse cursor 690 can select at least one surface on either side of a portion of the solid 605 as a selection of a face pair. Before selection, the selected surfaces were not associated to form a single unit as a face pair. Illustrating with a non-limiting example, the mouse cursor 690 can interact with any part of a surface (the face pair surface 612) and a surface opposite to the surface to select the face pair (e.g., the face pair 610). When an "add" command is received (before or after selecting the face pair 610) via the input device of the interface 170, the face pair 610 can be added to the solid 605. In other words, the face pairs associated with the solid 605 can include the face pair 610, which can be displayed as a face pair of the solid 605 based on any suitable criteria described herein. The added face pair 610 can be displayed in a different graphical state than the graphical state of the face pair 510 prior to the deletion.

Figure 7A:
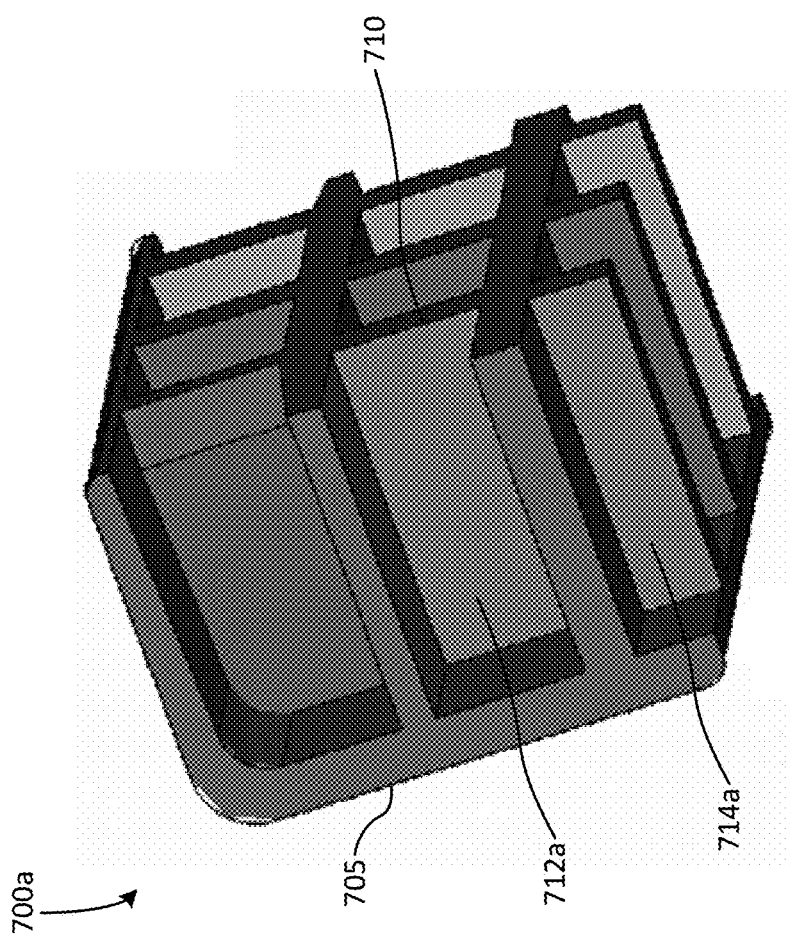
FIG. 7A is a diagram illustrating an example of a display screen showing a solid in a first perspective view according to some embodiments.
Figure 7B:
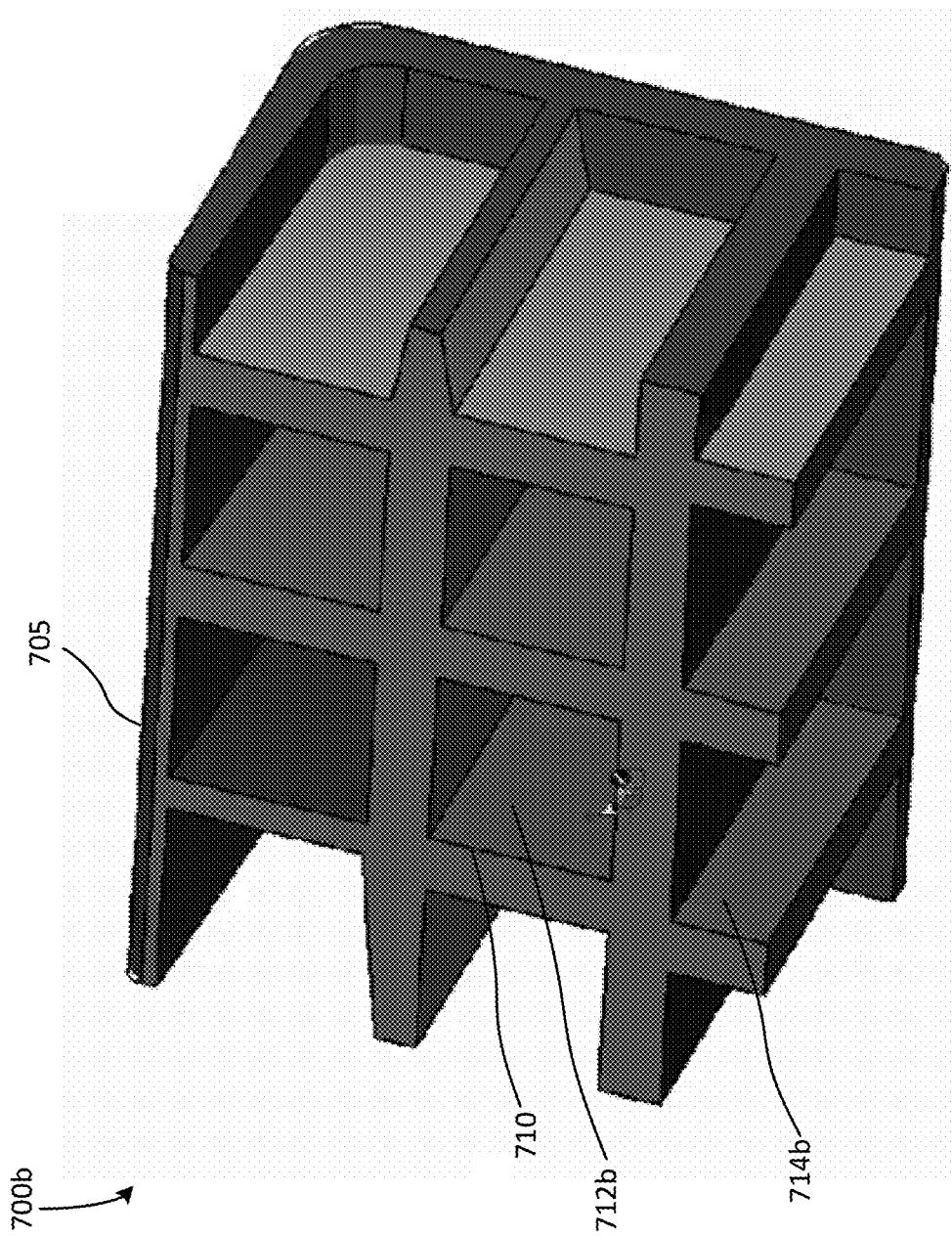
FIG. 7B is a diagram illustrating an example of a display screen showing a solid in a second perspective view according to some embodiments.

FIG. 7A is a diagram illustrating an example of a display screen 700a having a solid 705 shown in a first perspective view according to some embodiments. FIG. 7B is a diagram illustrating an example of a display screen 700b having the solid 705 shown in a second perspective view according to some embodiments. Referring to FIGS. 1-7B, the display screens 700a and 700b can be implemented for adding a surface 714b to a face pair 710 according to various embodiments. The surface 714b can be designated in any suitable manner (e.g., outlining boundaries of the surface 714 via the input device of the interface 170). In particular embodiments, all surfaces (e.g., all continuous surfaces) making up the solid 705 can be displayed, and the user can select, via the input device of the interface 170, the surface 714b. In some embodiments, the surface 714b can be not associated with any face pair of the solid 705. In other embodiments, the surface 714b can be associated with at least another face pair of the solid 705.

The solid 705 can include at least the face pair 710. The face pair 710 can initially include a first face pair surface 712a, a second face pair surface 712b, and a third face pair surface 714a. The first face pair surface 712a and the second face pair surface 712b can be on opposing sides of a portion of the solid 705. The third face pair surface 714a and the surface 714b can be on opposing sides of a portion of the solid 705. However, the surface 714b is not yet associated with the face pair 710. The surface 714b can be selected via the input device (e.g., a mouse cursor) of the interface 170. When an "add surface" command is received (prior to or after selecting the surface 714b and/or the face pair 710), the surface 714b can be added as a face pair surface of the face pair 710. In response to the adding, the surface 714b can be displayed as a part of the face pair 710 in the manner described.

Figure 8:
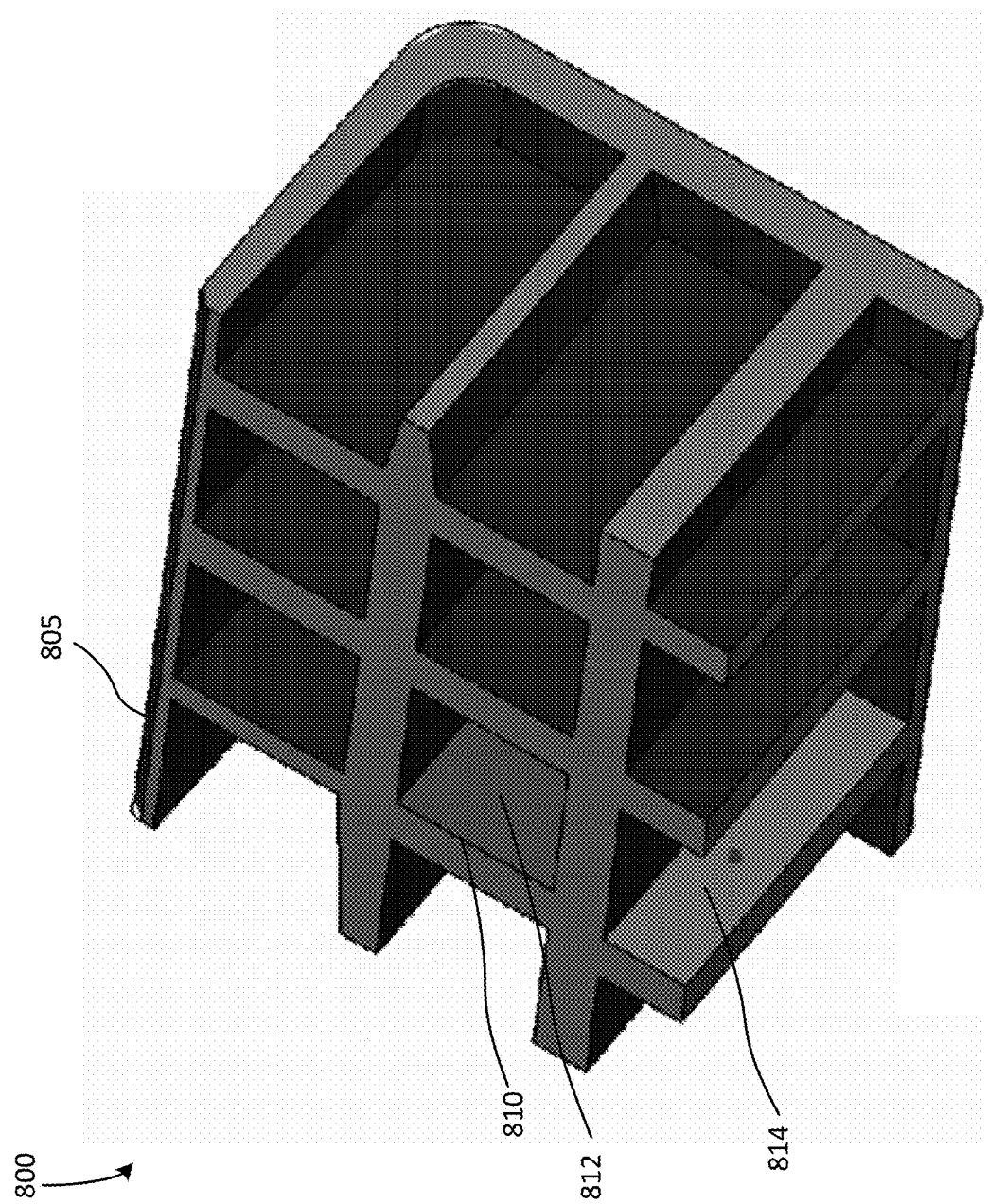
FIG. 8 is a diagram illustrating an example of a display screen implemented for removing a face pair surface from a face pair according to various embodiments.

FIG. 8 is a diagram illustrating an example of a display screen 800 implemented for removing a face pair surface 814 from a face pair 810 according to various embodiments. Referring to FIGS. 1-8, the face pair 810 of a solid 805 can include at least a first face pair surface 812 and a second face pair surface 814. The face pair surface 814 can be selected via the input device (e.g., a mouse cursor) of the interface 170. When an "remove surface" command is received (prior to or after selecting the face pair surface 814 and/or the face pair 810), the face pair surface 814 can be removed as a face pair surface of the face pair 810. In response to the removal, the deleted face pair surface 814 can no longer be displayed as a part of the face pair 810 in the manner described.

The deleted face pair surface 814 can be displayed in a different graphical state (e.g., greyed out, shaded, hidden, or the like) than the graphical state of the face pair 810 and/or the graphical state of the face pair surface 814 prior to the deletion. The face pair surface 814 can be designated in any suitable manner (e.g., outlining boundaries of the face pair surface 814 via the input device of the interface 170). In particular embodiments, all face pair surfaces (e.g., all continuous face pair surfaces) making up the face pair 810 can be displayed, and the user can select, via the input device of the interface 170, the face pair surface 814.

Figure 9A:
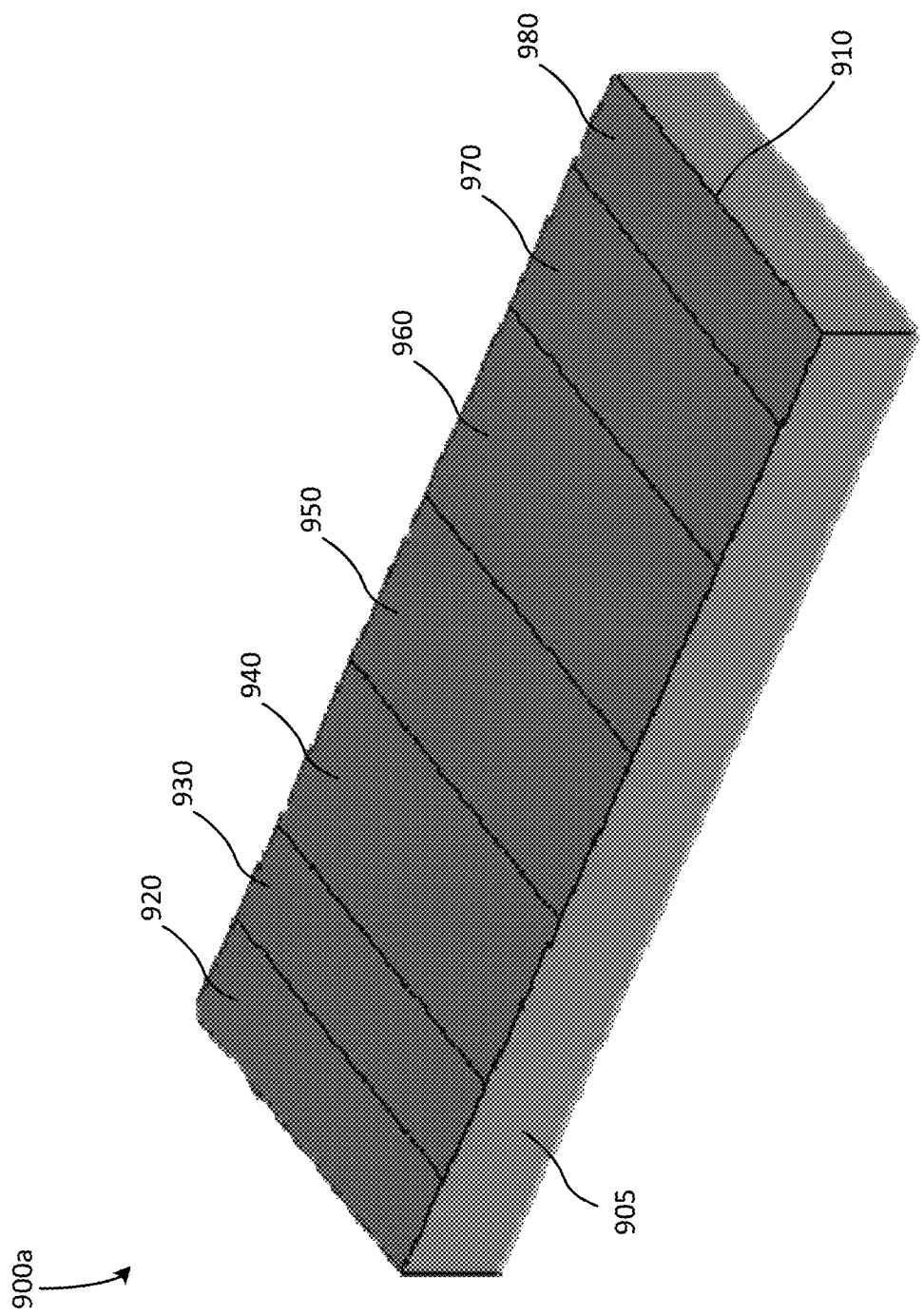
FIG. 9A is a diagram illustrating an example of a display screen implemented for splitting a face pair according to various embodiments.

FIG. 9A is a diagram illustrating an example of a display screen 900a implemented for splitting a face pair 910 according to various embodiments. Particularly, the display screen 900a illustrates the face pair 910 before the splitting. Referring to FIGS. 1-9A, the face pair 910 of the a solid 905 can include face pair surfaces such as, but not limited to, the face pair surfaces 920-980. Each of the face pair surfaces 920-980 can be associated with at least one opposing face pair surface (not shown in perspective) opposite to the respective one of the face pair surfaces 920-980.

The association can be automatically determined. In some embodiments, the face pair surfaces that are opposite to each other on a portion of the solid 905 (and, in further embodiments, of approximately the same size (within 10%, 15%, or 20% variation)) can be associated with one another automatically provided that they satisfy other criteria such as, but not limited to, the thickness ratio. In some embodiments, opposing face pair surfaces (that were previously another face pair) added to as a new part of the face pair 910 can be associated with each other. In some embodiments, the user can designate such associated via the input device of the interface 170.

Figure 9B:
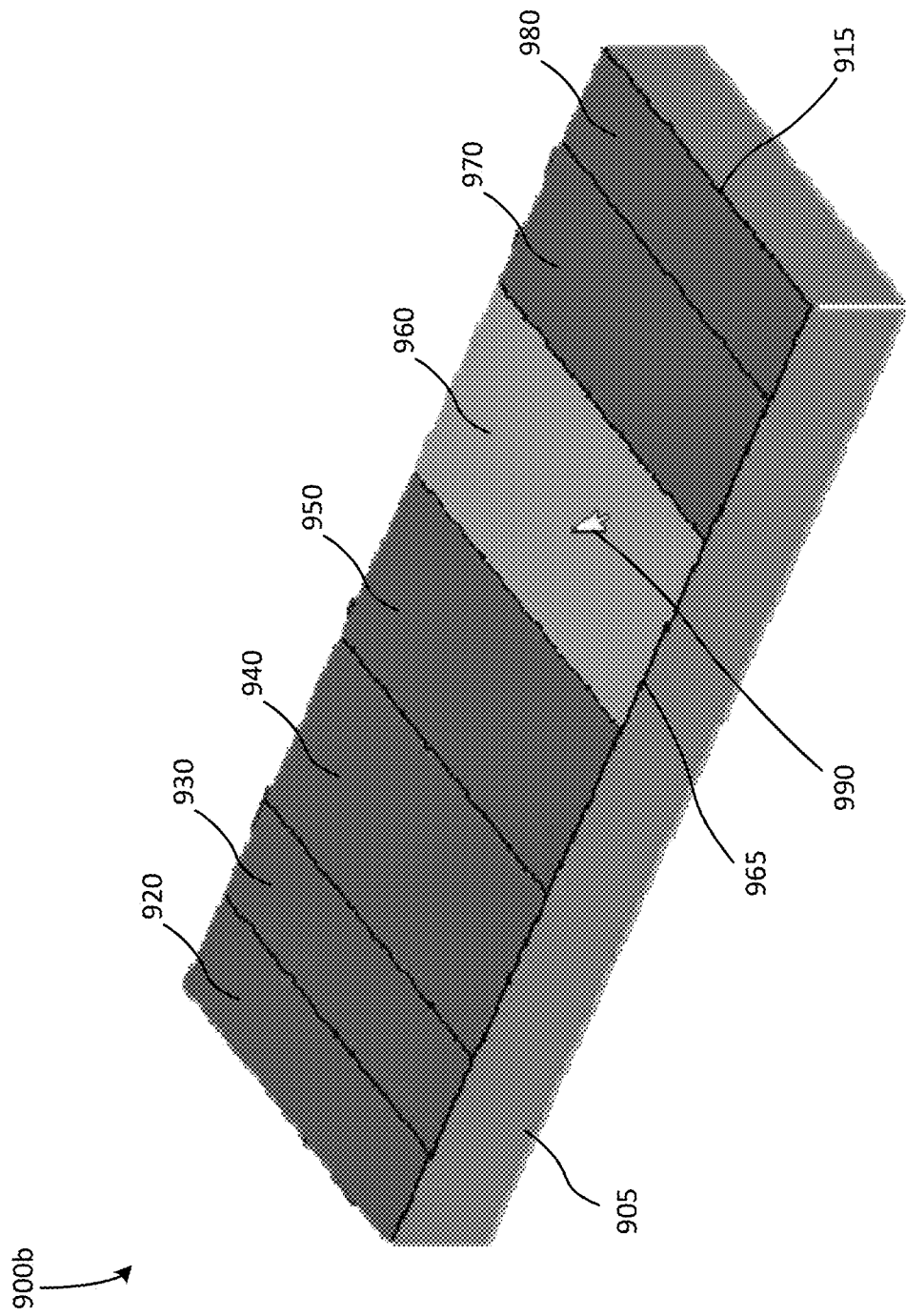
FIG. 9B is a diagram illustrating an example of a display screen implemented for splitting the face pair according to various embodiments.

FIG. 9B is a diagram illustrating an example of a display screen 900b implemented for splitting the face pair 910 according to various embodiments. Referring to FIGS. 1-9B, the display screen 900b illustrates adjusted face pairs 915 and 965 resulting from splitting the face pair 910. The user can select, via a mouse cursor 990 (as provided by the input device of the interface 170), one or more face pair surfaces such as, but not limited to, the face pair surface 960 by interacting with any portion thereof. When a "split" command has been received via the input device of the interface 170 (before or after selecting the face pair surface 960 and for the face pair 910, the face pair module 110 can divide the face pair 910 into the first adjusted face pair 915 and the second adjusted face pair 965. The first adjusted face pair 915 can include the face pair surfaces 920-950 and 970-980 (as well as their associated opposing face pair surfaces, if any). The second adjusted face pair 965 can include the face pair surface 960 and its associated opposing face pair surface.

In embodiments in which a selected face pair surface (to be split from a face pair) is not associated with any opposing face pair surface, the user can select an opposing face pair surface to form a separate face pair with the selected face pair surface. In some embodiments, the user can select an identified face pair surface opposite to the selected face pair surface (via the input device of the interface 170). In some embodiments, the user can outline boundaries of a surface opposite to the selected face pair surface (via the input device of the interface 170).

Figure 10:
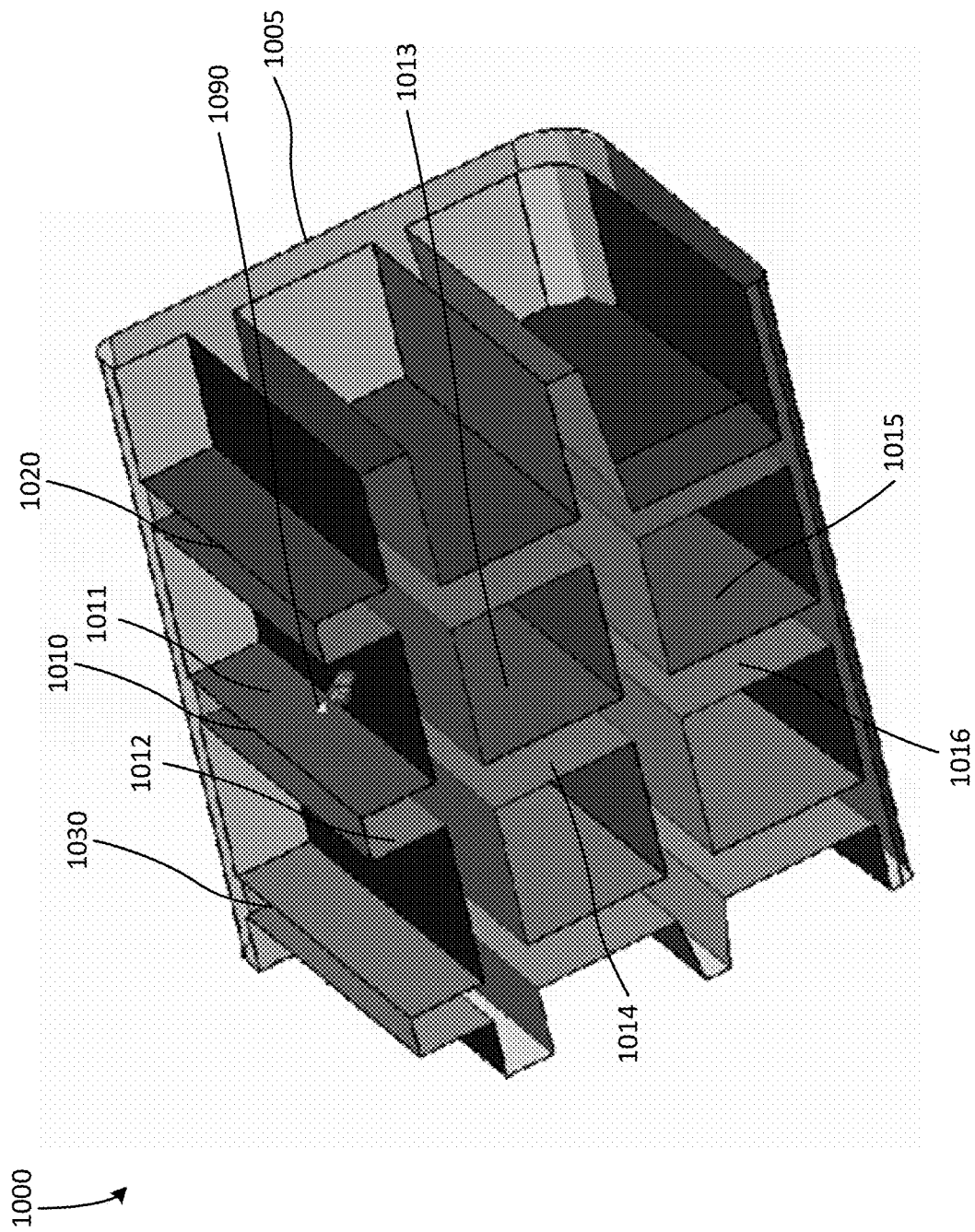
FIG. 10 is a diagram illustrating an example of a display screen implemented for displaying a first face pair emphatically according to various embodiments.

FIG. 10 is a diagram illustrating an example of a display screen 1000 implemented for displaying a first face pair 1010 emphatically (in a manner such as, but not limited to, described with respect to block B220) according to various embodiments. Referring to FIGS. 1-10, a solid 1005 can have a first face pair 1010, a second face pair 1020, and a third face pair 1030. Particularly, the first face pair 1010 can include face pair surfaces 1011-1016. The face pair surfaces 1011, 1013, and 1015 are not continuous. The face pair surfaces 1012, 1014, and 1016 are not continuous. The first face pair 1010 can be identified using the thickness ratio.

When a mouse cursor 1090 interacts with (e.g., clicks, mouses over, or the like) a portion of any of the face pair surfaces 1011-1016, the entire face pair 1010 can be displayed in an emphatic graphical state (e.g., including, but not limited to, different colors, shading, outlines, borders, highlights, and the like) as compared to graphical states of face pairs 1020 and 1030. Particularly, the first face pair 1010 can be displayed in a different graphical state without such interaction.

Figure 11A:
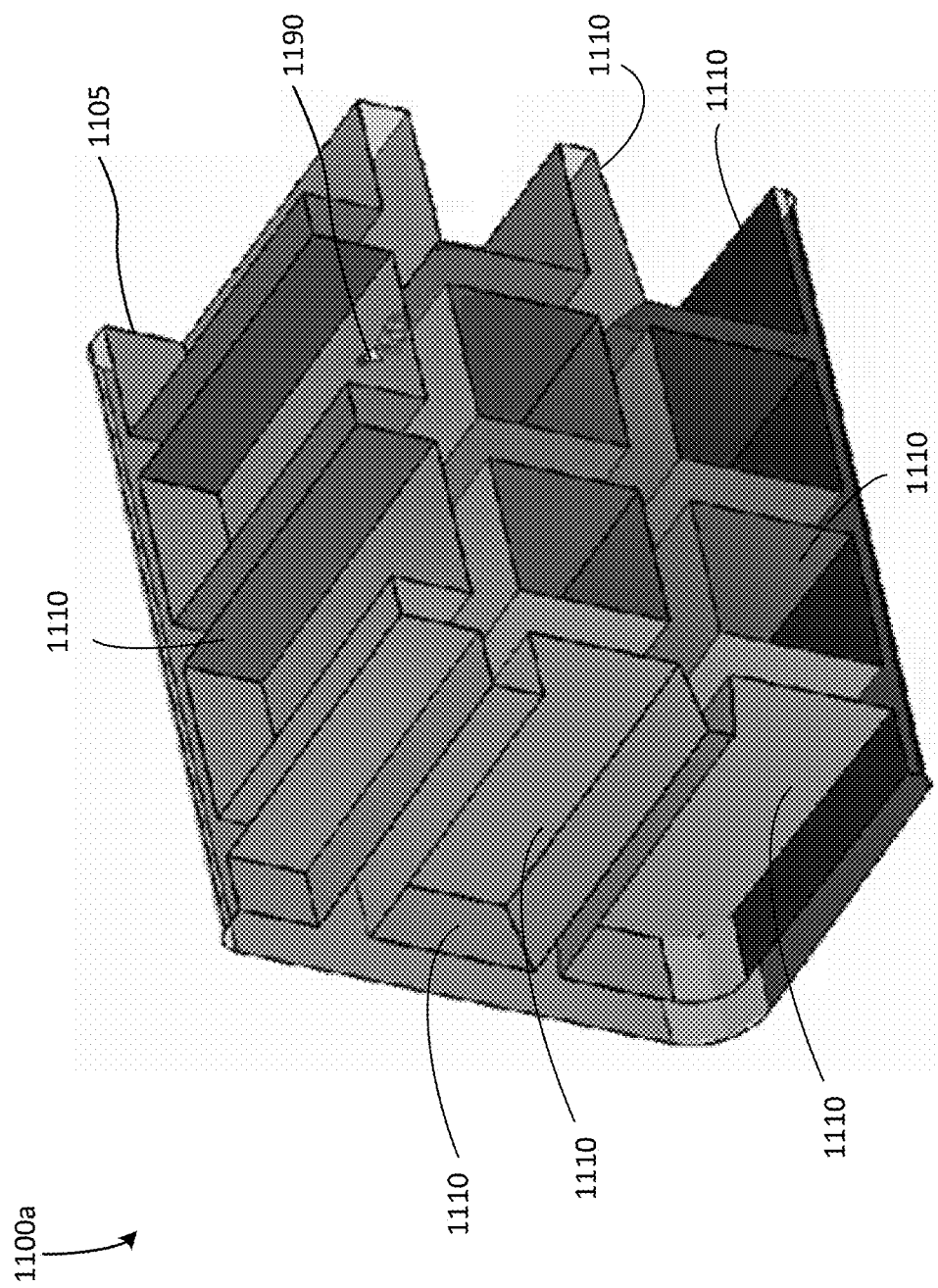
FIG. 11A is a diagram illustrating an example of a display screen implemented for selecting at least one face pair for incrementally extracting and displaying at least one mid-surface for a solid according to various embodiments.
Figure 11B:
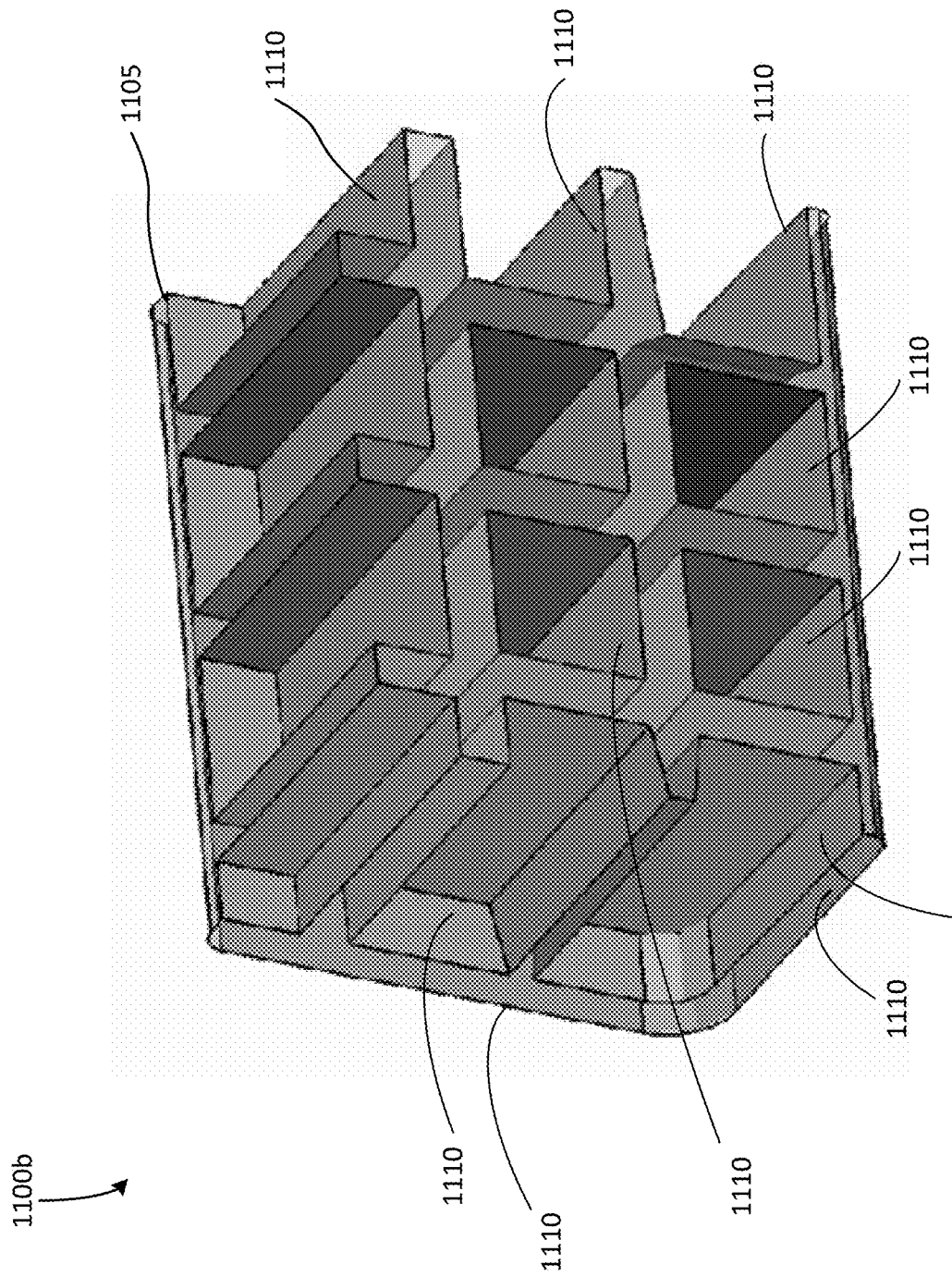
FIG. 11B is a diagram illustrating an example of a display screen implemented for displaying at least one face pair selected for incrementally extracting and displaying at least one mid-surface for a solid according to various embodiments.

FIG. 11A is a diagram illustrating an example of a display screen 1100a implemented for selecting at least one face pair for incrementally extracting and displaying at least one mid-surface for a solid 1105 according to various embodiments. FIG. 11B is a diagram illustrating an example of a display screen 1100b implemented for displaying the at least one face pair selected for incrementally extracting and displaying at least one mid-surface for the solid 1105 according to various embodiments. Referring to FIGS. 1-11B, a mouse cursor 1190 can be controlled by the user for selecting at least one face pair from which at least one mid-surface can be extracted. Illustrating with a non-limiting example, the face pair 1110 can be extracted. The display screen 1100b can show the selected face pair 1110 of the solid 1105 without showing 3-dimensional fill of the solid 1105. The face pair 1110 can include multiple face pair surfaces.

Figure 11C:
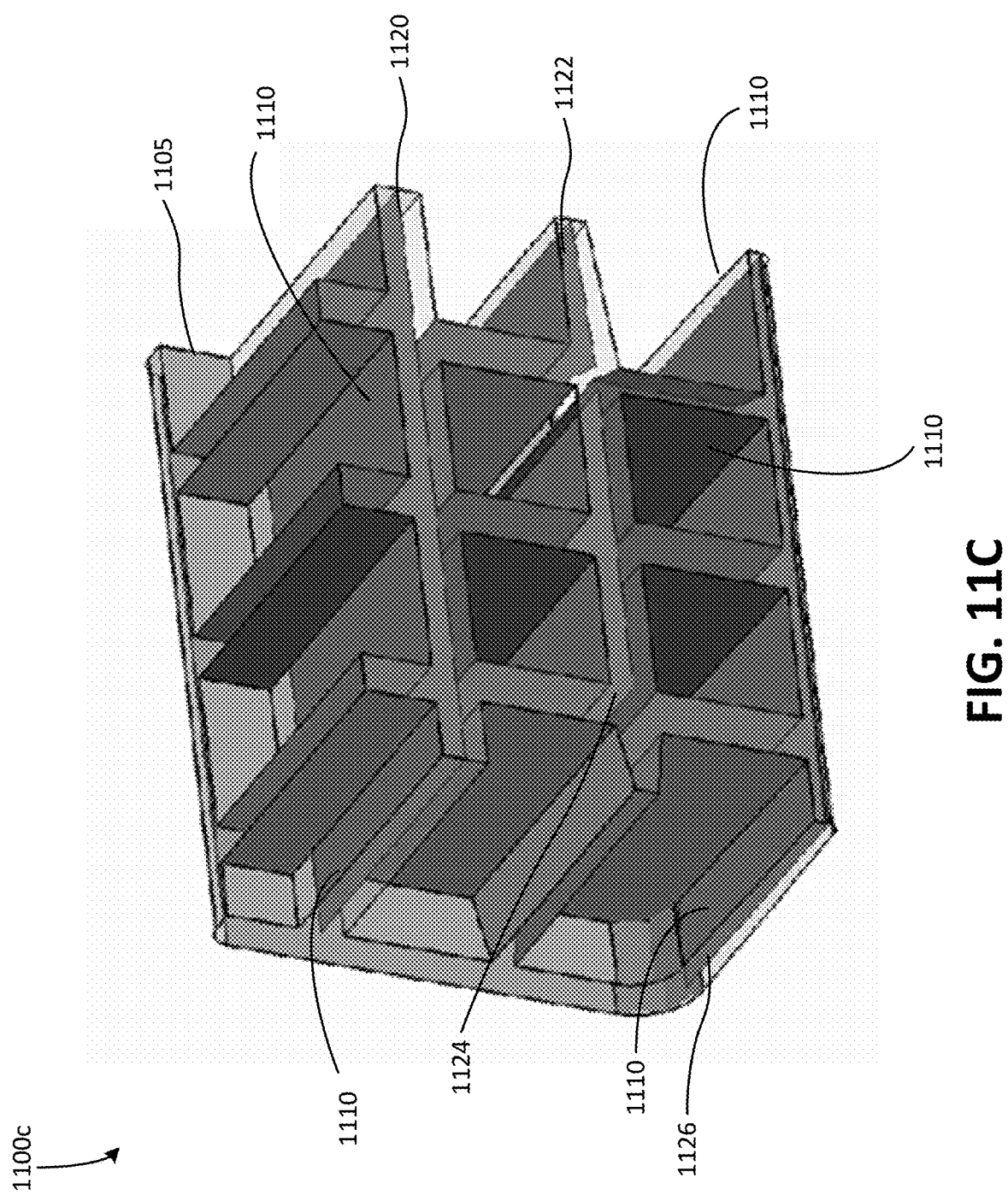
FIG. 11C is a diagram illustrating an example of a display screen implemented for displaying at least one mid-surface extracted based on a face pair according to various embodiments.

FIG. 11C is a diagram illustrating an example of a display screen 1100c implemented for displaying at least one mid-surface extracted based on the face pair 1110 according to various embodiments. Referring to FIGS. 1-11C, mid-surfaces 1120, 1122, 1124, and 1126 can be extracted from the face pair 1110 based on suitable methods described herein. The extracted mid-surfaces 1120, 1122, 1124, and 1126 can be displayed with the face pair 1110.

Figure 11D:
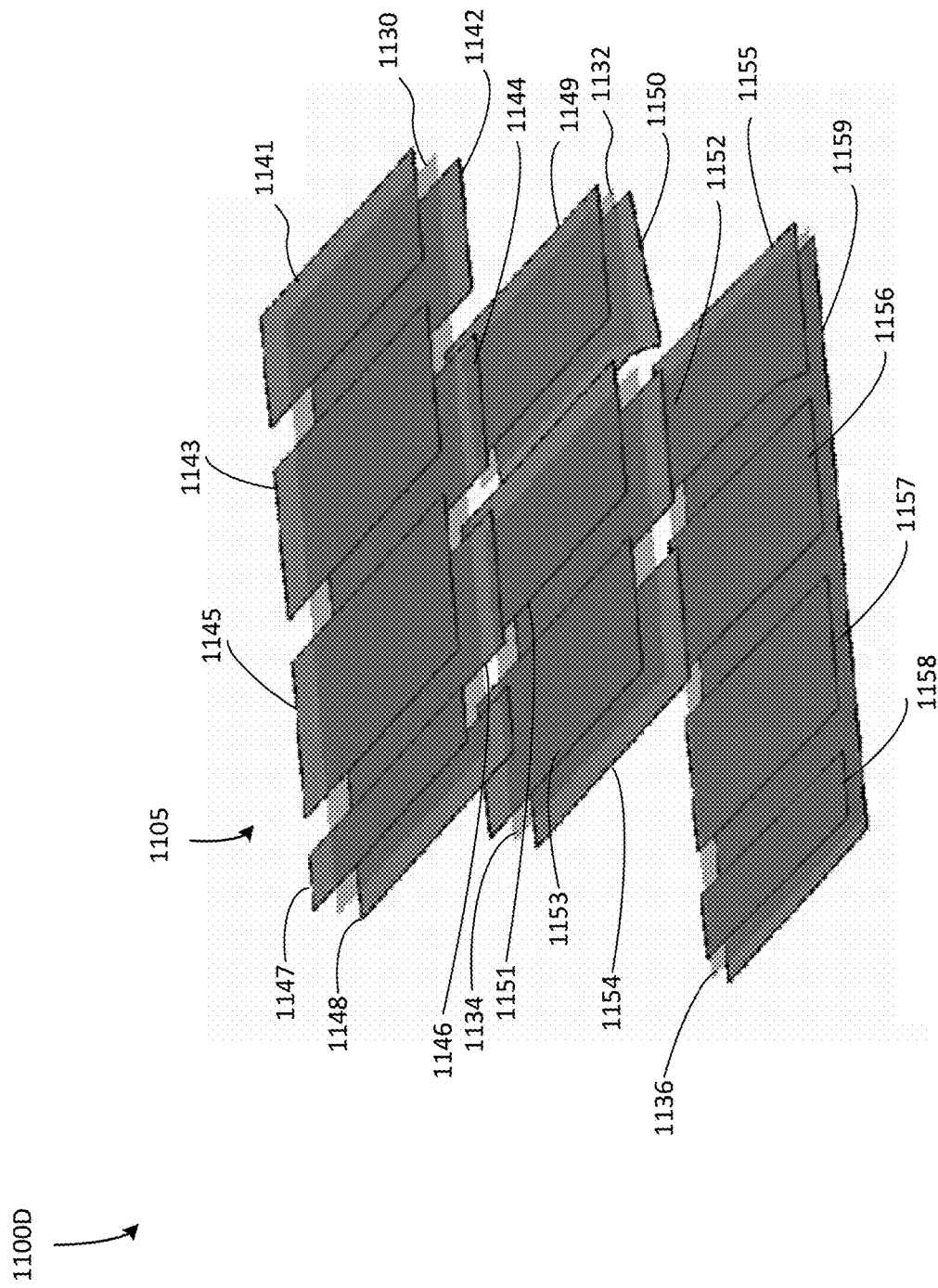
FIG. 11D is a diagram illustrating an example of a display screen implemented for previewing at least one mid-surface extracted based on a face pair according to various embodiments.

FIG. 11D is a diagram illustrating an example of a display screen 1100d implemented for previewing at least one mid-surface extracted for the solid 1105 according to various embodiments. Referring to FIGS. 1-11D, extracted mid-surfaces 1130, 1132, 1134, and 1136 can be displayed in the display screen 1100d. Relevant portions of the face pair 1110 used to extract the mid-surfaces 1130, 1132, 1134, and 1136 can also be displayed. Such relevant portions can include face pair surfaces 1141-1148, which can correspond to the mid-surface 1130. Such relevant portions can also include face pair surfaces 1149 and 1150, which can correspond to the mid-surface 1132. Such relevant portions can also include face pair surfaces 1151-1154, which can correspond to the mid-surface 1134. Such relevant portions can also include face pair surfaces 1155-1159, which can correspond to the mid-surface 1136. The rest of the solid 1105 is not displayed in the display screen 1100d to allow the user to preview the mid-surfaces 1130, 1132, 1134, and 1136.

Figure 12B:
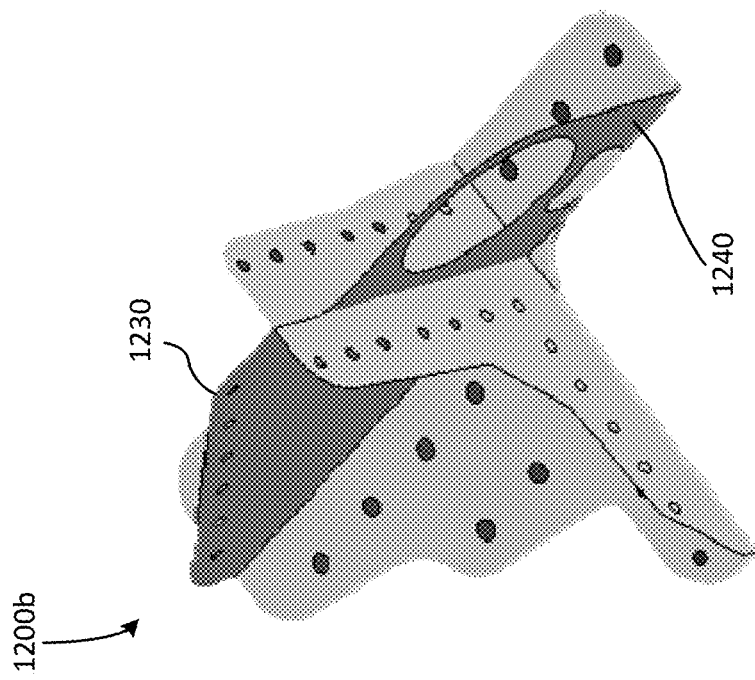
FIG. 12B is a diagram illustrating an example of a display screen showing aligned mid-surfaces in response to a merging of associated face pairs according to various embodiments.
Figure 12A:
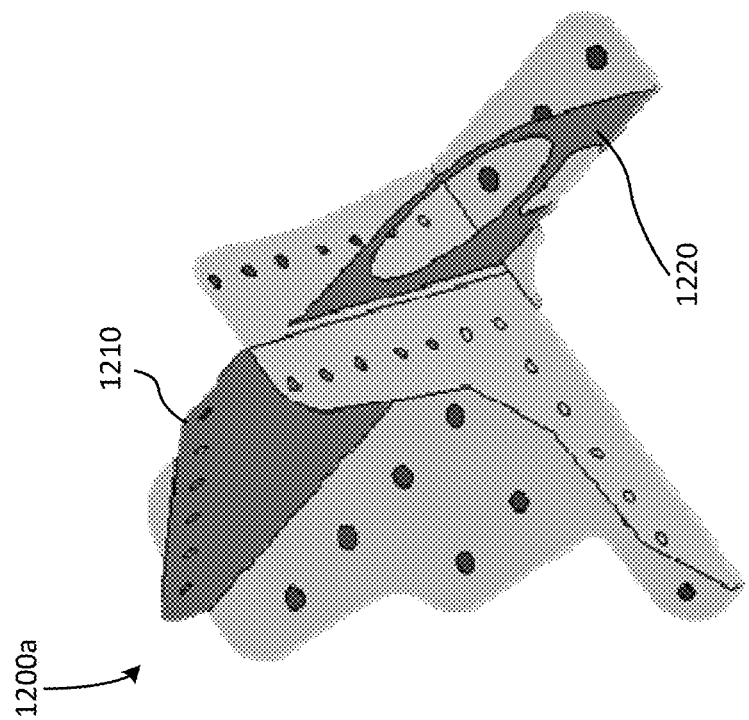
FIG. 12A is a diagram illustrating an example of a display screen showing mid-surfaces before merging of associated face pairs according to various embodiments.

FIG. 12A is a diagram illustrating an example of a display screen 1200a showing mid-surfaces 1210 and 1220 before merging of associated face pairs according to various embodiments. FIG. 12B is a diagram illustrating an example of a display screen 1200b showing aligned mid-surfaces 1230 and 1240 in response to a merging of associated face pairs according to various embodiments. Referring to FIGS. 1-12B, a preview of mid-surfaces (including at least the mid-surfaces 1210 and 1220) can be displayed via the display device of the interface 170. The mid-surfaces 1210 and 1220 are not aligned (i.e., do not rest on a same plane).

In response to merging face pairs associated with the mid-surfaces 1210 and 1220, the resulting mid-surfaces 1230 and 1240 can be automatically aligned (i.e., modified to rest on a same plane). The mid-surface 1230 can correspond to the mid-surface 1210. The mid-surface 1230 can be in a same position as the mid-surface 1210. The mid-surface 1240 can correspond to the mid-surface 1220. The mid-surface 1240 can be moved by the mid-surface module 120 automatically to align with the mid-surface 1230 (the mid-surface 1210). In further embodiments, the face pairs themselves (including one or more face pair surfaces) can also be aligned in a similar manner.

FIG. 13 is a process flow diagram illustrating an example of face pair merging method 1300 for merging at least a first face pair and a second face pair according to various embodiments. Referring to FIGS. 1-13, the face pair module 110 can identify at least two face pairs including the first face pair and the second face pair at block B1310 (in a manner such as, but not limited to, described with respect to blocks B210 or B310). Each of the first and second face pairs can include at least two opposing face pair surfaces. At block B1320, the face pair module 110 can receive (via the interface 170) user input to merge the first face pair and the second face pair. In response to receiving the user input, the face pair module 110 can merge the first face pair and the second face pair to generate an adjusted face pair based on the user input at block B1330 in the manner described herein.

FIG. 14 is a process flow diagram illustrating an example of face pair splitting method 1400 for splitting a first face pair into at least a second face pair and a third face pair according to various embodiments. Referring to FIGS. 1-14, the face pair module 110 can identify a first face pair including at least two opposing face pair surfaces, at block B1410 (in a manner such as, but not limited to, described with respect to blocks B210 or B310). At block B1420, the face pair module 110 can receive (via the interface 170) user input to split the first face pair. In response to receiving the user input, the face pair module 110 can split the first face pair into at least a second face pair and a third face pair base on the user input, at block B1430. Particularly, the second face pair can include face pair surfaces that are portions of the face pair surfaces of the first face pair. The third face pair can include face pair surfaces that are separate portions of the face pair surfaces of the first face pair.

While embodiments described herein illustrate various selection methods using a mouse cursor, the input device of the interface 170 can provide other mechanisms to receive user selection such as, but not limited to, touch screen, voice input, and the like.

The terms "system", "logic", "data processing apparatus" or "computing device" encompasses all kinds of circuits, apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question (e.g., code that constitutes processor firmware, a protocol stack, a database management system, an operating system, a cross-platform runtime environment, a virtual machine, or a combination of one or more of them). The apparatus and execution environment can realize various different computing model infrastructures, such as web services, distributed computing and grid computing infrastructures.

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, all such modifications are intended to be included within the scope of the present disclosure. Other substitutions, modifications, changes, and omissions can be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure can be implemented using existing computer processors, or by a special purpose computer processor for an appropriate system, incorporated for this or another purpose, networked systems or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions. The machine-executable instructions can be executed on any type of computing device (e.g., computer, laptop, etc.) or can be embedded on any type of electronic device (e.g., a portable storage device such as a flash drive, etc.).

Although the figures can show a specific order of method steps, the order of the steps can differ from what is depicted. Also, two or more steps can be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision step.

What is claimed is:

1. A method for generating face pair surfaces of a solid by a computer simulation platform, the method comprising:
   initially identifying, by the computer simulation platform, a first face pair, the first face pair comprising a first plurality of surfaces and a second plurality of surfaces identified as surfaces of the first face pair, wherein a respective one of the first plurality of surfaces opposes and faces a corresponding one of the second plurality of surfaces, the first plurality of surfaces comprises at least one surface;
   graphically displaying, by the computer simulation platform, the first face pair;
   improving automatic identification of the first face pair and correcting the first face pair by incrementally:
      after initially identifying the first face pair, receiving, by the computer simulation platform, user input corresponding to selecting and excluding the at least one surface of the first face pair from being identified as a surface of the first face pair;
      determining, by the computer simulation platform, at least one adjusted first face pair based on the user input, the at least one adjusted first face pair comprises the first plurality of surfaces and the second plurality of surfaces with the at least one surface excluded;
      in response to determining the at least one adjusted first face pair, graphically displaying, by the computer simulation platform, the adjusted face pair and hiding the excluded at least one surface from being displayed; and
      determining, by the computer simulation platform, a mid-surface of the solid based on the at least one adjusted face pair.

2. The method of claim 1, further comprising:
   selecting the first face pair by receiving user input related to selecting a respective one of the first plurality of surfaces or the corresponding one of the second plurality of surfaces of the first face pair; and
   graphically displaying the first face pair in an emphatic graphical state in response to the selecting.

3. The method of claim 1, wherein the first face pair and a second face pair are displayed in different graphical states, wherein the different graphical states correspond to one or more of different colors, different shading, different outlines, different borders, or different highlights.

4. The method of claim 1, wherein:
   the first plurality of surfaces of the first face pair comprises a first surface portion and a second surface portion; and
   the first surface portion and the second surface portion are separated.

5. The method of claim 1, wherein:
the first plurality of surfaces of the first face pair comprises a first surface portion and a second surface portion; and
the first surface portion and the second surface portion are in a same plane.

6. The method of claim 1, further comprising:
displaying the first face pair and a second face pair in different graphical states based on different methods by which the first face pair and the second face pair are identified, wherein the different graphical states correspond to one or more of different colors, different shading, different outlines, different borders, or different highlights, and the different methods identify the first face pair and the second face pair based on dimensions of the first face pair and the second face pair.

7. The method of claim 6, wherein the first face pair and the second face pair are identified based, at least in part, on one or more of dimensions of the surface, area of the surface, distance between the two opposing surface, or thickness ratio.

8. The method of claim 1, further comprising:
determining a first mid-surface for the first face pair;
determining a second mid-surface for a second face pair; and
displaying the first face pair and the second face pair in different graphical states based on different methods by which the first mid-surface and the second mid-surface are determined, wherein the different graphical states correspond to one or more of different colors, different shading, different outlines, different borders, or different highlights, and the different methods determine the first mid-surface and the second mid-surface based on dimensions of the first face pair and the second face pair.

9. The method of claim 1, further comprising:
determining a first mid-surface for the first face pair;
determining a second mid-surface for a second face pair; and
displaying the first mid-surface and the second mid-surface in different graphical states based on different methods by which the first mid-surface and the second mid-surface are determined, wherein the different graphical states correspond to one or more of different colors, different shading, different outlines, different borders, or different highlights, and the different methods determine the first mid-surface and the second mid-surface based on dimensions of the first face pair and the second face pair.

10. A non-transitory computer-readable medium of a computer simulation platform including computer-readable instructions, such that, when executed, causes a processor of the computer simulation platform to perform a method for generating face pair surfaces of a solid, the method comprising:
initially identifying, by the computer simulation platform, a first face pair, the first face pair comprising a first plurality of surfaces and a second plurality of surfaces identified as surfaces of the first face pair, wherein a respective one of the first plurality of surfaces opposes and faces a corresponding one of the second plurality of surfaces, the first plurality of surfaces comprises at least one surface;
graphically displaying, by the computer simulation platform, the first face pair;
improving automatic identification of the first face pair and correcting the first face pair by incrementally:
after initially identifying the first face pair, receiving, by the computer simulation platform, user input corresponding to selecting and excluding the at least one surface of the first face pair from being identified as a surface of the first face pair;
determining, by the computer simulation platform, at least one adjusted first face pair based on the user input, the at least one adjusted first face pair comprises the first plurality of surfaces and the second plurality of surfaces with the at least one surface excluded;
in response to determining the at least one adjusted first face pair, graphically displaying, by the computer simulation platform, the adjusted face pair and hiding the excluded at least one surface from being displayed; and
determining, by the computer simulation platform, a mid-surface of the solid based on the at least one adjusted face pair.

11. The non-transitory computer-readable medium of claim 10, wherein the method further comprises:
selecting the first face pair by receiving user input related to selecting a respective one of the first plurality of surfaces or the corresponding one of the second plurality of surfaces of the first face pair; and
graphically displaying the first face pair in an emphatic graphical state in response to the selecting.

12. The non-transitory computer-readable medium of claim 10, wherein the first face pair and a second face pair are displayed in different graphical states, wherein the different graphical states correspond to one or more of different colors, different shading, different outlines, different borders, or different highlights.

13. The non-transitory computer-readable medium of claim 10, wherein:
the first plurality of surfaces of the first face pair comprises a first surface portion and a second surface portion; and
the first surface portion and the second surface portion are separated.

14. The non-transitory computer-readable medium of claim 10, wherein:
the first plurality of surfaces of the first face pair comprises a first surface portion and a second surface portion; and
the first surface portion and the second surface portion are in a same plane.

15. The non-transitory computer-readable medium of claim 10, wherein the method further comprises
displaying the first face pair and a second face pair in different graphical states based on different methods by which the first face pair and the second face pair are identified, wherein the different graphical states correspond to one or more of different colors, different shading, different outlines, different borders, or different highlights, and the different methods identify the first face pair and the second face pair based on dimensions of the first face pair and the second face pair.

16. The non-transitory computer-readable medium of claim 10, wherein the first face pair and the second face pair are identified based, at least in part, on one or more of dimensions of the surface, area of the surface, distance between the two opposing surface, or thickness ratio.

17. The non-transitory computer-readable medium of claim 10, wherein the method further comprises:
   determining a first mid-surface for the first face pair;
   determining a second mid-surface for a second face pair; and
   displaying the first face pair and the second face pair in different graphical states based on different methods by which the first mid-surface and the second mid-surface are determined, wherein the different graphical states correspond to one or more of different colors, different shading, different outlines, different borders, or different highlights, and the different methods determine the first mid-surface and the second mid-surface based on dimensions of the first face pair and the second face pair.

18. The non-transitory computer-readable medium of claim 10, wherein the method further comprises:
   determining a first mid-surface for the first face pair;
   determining a second mid-surface for a second face pair; and
   displaying the first mid-surface and the second mid-surface in different graphical states based on different methods by which the first mid-surface and the second mid-surface are determined, wherein the different graphical states correspond to one or more of different colors, different shading, different outlines, different borders, or different highlights, and the different methods determine the first mid-surface and the second mid-surface based on dimensions of the first face pair and the second face pair.

19. A system comprising:
   at least one processor configured to perform a method for generating face pair surfaces of a solid, the method comprising:
   initially identifying a first face pair, the first face pair comprising a first plurality of surfaces and a second plurality of surfaces identified as surfaces of the first face pair, wherein a respective one of the first plurality of surfaces opposes and faces a corresponding one of the second plurality of surfaces, the first plurality of surfaces comprises at least one surface;
   graphically displaying the first face pair;
   improving automatic identification of the first face pair and correcting the first face pair by incrementally:
      after initially identifying the first face pair, receiving user input corresponding to selecting and excluding the at least one surface of the first face pair from being identified as a surface of the first face pair;
      determining at least one adjusted first face pair based on the user input, the at least one adjusted first face pair comprises the first plurality of surfaces and the second plurality of surfaces with the at least one surface excluded;
      in response to determining the at least one adjusted first face pair, graphically displaying the adjusted face pair and hiding the excluded at least one surface from being displayed; and
      determining a mid-surface of the solid based on the at least one adjusted face pair.

20. The system of claim 19, wherein the method further comprises:
   selecting the first face pair by receiving user input related to selecting a respective one of the first plurality of surfaces or the corresponding one of the second plurality of surfaces of the first face pair; and
   graphically displaying the first face pair in an emphatic graphical state in response to the selecting.

\* \* \* \* \*